US012148983B2

(12) United States Patent
Yun et al.

(10) Patent No.: US 12,148,983 B2
(45) Date of Patent: Nov. 19, 2024

(54) WEARABLE ELECTRONIC DEVICE INCLUDING PLURALITY OF ANTENNAS AND COMMUNICATION METHOD THEREOF

(71) Applicant: SAMSUNG ELECTRONICS CO., LTD., Suwon-si (KR)

(72) Inventors: Juhwan Yun, Suwon-si (KR); Sungkwang Yang, Suwon-si (KR); Jongmin Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 353 days.

(21) Appl. No.: 17/702,173

(22) Filed: Mar. 23, 2022

(65) Prior Publication Data

US 2022/0285828 A1 Sep. 8, 2022

Related U.S. Application Data

(63) Continuation of application No. PCT/KR2022/003194, filed on Mar. 7, 2022.

(30) Foreign Application Priority Data

Mar. 8, 2021 (KR) ........................ 10-2021-0030097

(51) Int. Cl.
*H01Q 1/27* (2006.01)
*H01Q 1/22* (2006.01)
(Continued)

(52) U.S. Cl.
CPC ........... *H01Q 1/273* (2013.01); *H01Q 1/2291* (2013.01); *H01Q 21/28* (2013.01); *H01Q 25/005* (2013.01)

(58) Field of Classification Search
CPC ...... H01Q 1/2291; H01Q 1/273; H01Q 21/28; H01Q 25/005
See application file for complete search history.

(56) References Cited

U.S. PATENT DOCUMENTS 9,258,028 B2 2/2016 Katayama
9,921,453 B2 3/2018 Tiecke et al.
(Continued)

FOREIGN PATENT DOCUMENTS

CN 213302671 U 5/2021
JP 2002-247484 A 8/2002
(Continued)

OTHER PUBLICATIONS

International Search Report 9PCT/ISA/210) issued Jun. 17, 2022 by the International Searching Authority in International Patent Application No. PCT/KR2022/003194.
(Continued)

*Primary Examiner* — Daniel Munoz
(74) *Attorney, Agent, or Firm* — Sughrue Mion, PLLC

(57) ABSTRACT

An electronic device includes a main body, a pair of glass lenses configured to be supported by the main body, at least one display module configured to be disposed on the pair of glass lenses, a first support configured to be rotatably connected to the main body, a second support configured to be rotatably connected to the main body and configured to be disposed to be spaced apart from the first support, a communication module configured to be disposed in the first support, a processor configured to be operatively connected to the communication module, a relay module configured to be disposed in the second support and configured to relay at least one signal, and a first antenna configured to be disposed in the second support and configured to be electrically connected to the relay module.

13 Claims, 9 Drawing Sheets

(51) Int. Cl.

| | |
|---|---|
| ***H01Q 21/28*** | (2006.01) |
| ***H01Q 25/00*** | (2006.01) |

(56) References Cited

U.S. PATENT DOCUMENTS

| | | | |
|---|---|---|---|
| 9,977,245 | B2 | 5/2018 | Mack et al. |
| 10,305,175 | B2 | 5/2019 | Psychoudakis et al. |
| 10,374,294 | B2 | 8/2019 | Hiramatsu |
| 10,534,203 | B2 | 1/2020 | Olgun et al. |
| 11,056,783 | B2 * | 7/2021 | Pu .......................... H01Q 3/247 |
| 11,114,773 | B2 * | 9/2021 | Gorcea ................ H04R 1/1008 |
| 2008/0055537 | A1 | 3/2008 | Asrani et al. |
| 2017/0279188 | A1 | 9/2017 | Hiramatsu |
| 2018/0062248 | A1 | 3/2018 | Psychoudakis et al. |
| 2018/0093177 | A1 | 4/2018 | Tokubo |
| 2019/0033622 | A1 | 1/2019 | Olgun et al. |
| 2019/0198981 | A1 | 6/2019 | Moore et al. |
| 2019/0229395 | A1 | 7/2019 | Hintermann et al. |
| 2020/0264455 | A1 | 8/2020 | Olgun et al. |
| 2021/0219147 | A1 | 7/2021 | Mizunuma et al. |

FOREIGN PATENT DOCUMENTS

| | | | |
|---|---|---|---|
| JP | 2015-233228 | A | 12/2015 |
| JP | 2017-175438 | A | 9/2017 |
| KR | 10-2019-0035695 | A | 4/2019 |
| KR | 10-2020-0029592 | A | 3/2020 |
| WO | 2016/138438 | A1 | 9/2016 |

OTHER PUBLICATIONS

Written Opinion (PCT/ISA/237) issued Jun. 17, 2022 by the International Searching Authority in International Patent Application No. PCT/KR2022/003194.

Communication issued Mar. 14, 2024 by the European Patent Office in counterpart European Application No. 22767440.5.

Wang et al., "Sub-6GHz 4G/5G Conformal Glasses Antennas," IEEE Access, vol. 7, pp. 182027-182036, Date of publication: Dec. 13, 2019, Date of current version: Dec. 26, 2019, XP011762910, DOI: 10.1109/Access.2019.2959603.

* cited by examiner

WEARABLE ELECTRONIC DEVICE INCLUDING PLURALITY OF ANTENNAS AND COMMUNICATION METHOD THEREOF

CROSS-REFERENCE TO RELATED APPLICATION(S)

This application is a by-pass continuation of International Application No. PCT/KR2022/003194, filed on Mar. 7, 2022, in the Korean Intellectual Property Receiving Office, which is based on and claims priority to Korean Patent Application No. 10-2021-0030097, filed on Mar. 8, 2021, in the Korean Intellectual Property Office, the disclosures of which are incorporated by reference herein in their entireties.

BACKGROUND

1. Field

The disclosure relates generally to a wearable electronic device including multiple antennas, and a communication method of a wearable electronic device including multiple antennas.

2. Description of Related Art

In order to implement virtual reality (VR) and augmented reality (AR), various wearable electronic devices may be connected to a portable wireless electronic device (for example, a smartphone) by using wireless communication. Such wearable electronic devices are epitomized by eyeglass-type devices, which may also be referred to as mixed reality (XR) glass.

An eyeglass-type wearable electronic device may display images on eyeglass lenses to implement AR. Light may be projected onto eyeglass lenses to display images on the lenses. For example, a projector having a very small size (for example, a micro projector or pico projector) may be used. Examples of such projector may include a laser scanning display (LSD), a raster/retinal scanning display (RSD), a digital micro-mirror display (DMD), and a liquid crystal on silicon (LCoS). In addition, a transparent display may be used to display image on lenses.

Wearable devices have evolved into accessory types and thus replaced existing fashion items. Therefore, wearable devices have become lightweight and compact in line with increasing attention to aesthetic design and portability. Compactness and slimness of eyeglass-type wearable devices also have become important in connection with design. Therefore, wearable electronic devices may have limited arrangement space.

An eyeglass-type wearable device is, due to characteristics thereof, presumably worn on the user's body, particularly on the head, and used. In this case, the communication performance is heavily affected by the physical position of the antenna when the same is worn and used.

An eyeglass-type wearable electronic device may, due to characteristics thereof, have an antenna signal radiation area affected depending on the relative position between the antenna and the user's head. For example, there is a possibility that the antenna signal radiation area will be reduced (for example, radiation shading generated) or distorted.

SUMMARY

Additional aspects will be set forth in part in the description which follows and, in part, will be apparent from the description, or may be learned by practice of the presented embodiments.

In accordance with an aspect of the disclosure, an electronic device may include a main body, a pair of glass lenses configured to be supported by the main body, at least one display module configured to be disposed on the pair of glass lenses, a first support configured to be rotatably connected to the main body, a second support configured to be rotatably connected to the main body and configured to be disposed to be spaced apart from the first support, a communication module configured to be disposed in the first support, a processor configured to be operatively connected to the communication module, a relay module configured to be disposed in the second support and configured to relay at least one signal, a first antenna configured to be disposed in the second support and configured to be electrically connected to the relay module, and a second antenna configured to be disposed in the second support and configured to be electrically connected to the relay module. The processor may be further configured to control the communication module to radiate a first signal to the relay module. The relay module may be further configured to radiate a second signal corresponding to the first signal to an outside of the electronic device using the second antenna.

The relay module may be further configured to receive a third signal from the outside using the second antenna and to radiate a fourth signal corresponding to the third signal to the communication module. The processor may be further configured to control the communication module to receive the fourth signal.

The relay module may be further configured to convert the third signal into the fourth signal.

The processor may be further configured to control the communication module to convert the fourth signal.

The electronic device may include a third antenna configured to be disposed in the first support and configured to be electrically connected to the communication module. The processor may be further configured to radiate the first signal to the first antenna using the third antenna.

The second signal may include a signal obtained by frequency-converting the first signal.

The first signal may include a first frequency band that is different from a second frequency band of the second signal.

The second signal may include at least one frequency band among 2.4 GHz, 5 GHz, or 6 GHz, and the first signal may include a frequency band other than the at least one frequency band of the second signal.

The second signal may include a signal obtained by amplifying the first signal.

The second signal may include a signal obtained by relaying the first signal.

The communication module may be configured to support communication of at least one of Bluetooth and Wi-Fi.

The first antenna may include a directional antenna.

The first support and the second support may be configured to be rotated and disposed to face each other in an open state, the first antenna may be configured to be disposed on a first side surface where the second support faces the first support, and the second antenna may be configured to be disposed on a second side surface of the second support opposite the first side surface.

In accordance with an aspect of the disclosure, a method of an electronic device including a communication module and a relay module configured to be disposed to be spaced apart from the communication module may include radiating, by the communication module, a first signal to the relay module, receiving, by the relay module, the first signal, and radiating, by the relay module, a second signal corresponding to the first signal to an outside of the electronic device.

The method may include receiving, by the relay module, a third signal from the outside, radiating, by the relay module and to the communication module, a fourth signal corresponding to the third signal, and receiving, by the communication module, the fourth signal.

The method may include converting, by the relay module, the third signal into the fourth signal.

The method may include converting, by the communication module, the fourth signal.

The third signal may include a signal obtained by amplifying the second signal.

The second signal may include a signal obtained by frequency-converting the first signal.

The first signal may include a first frequency band that is lower than a second frequency band of the second signal.

According to various embodiments, an electronic device may have constituent elements arranged in a limited arrangement space such that the same becomes lightweight and compact. Radiation shading due to the user's head may be reduced, thereby ensuring efficient communication.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
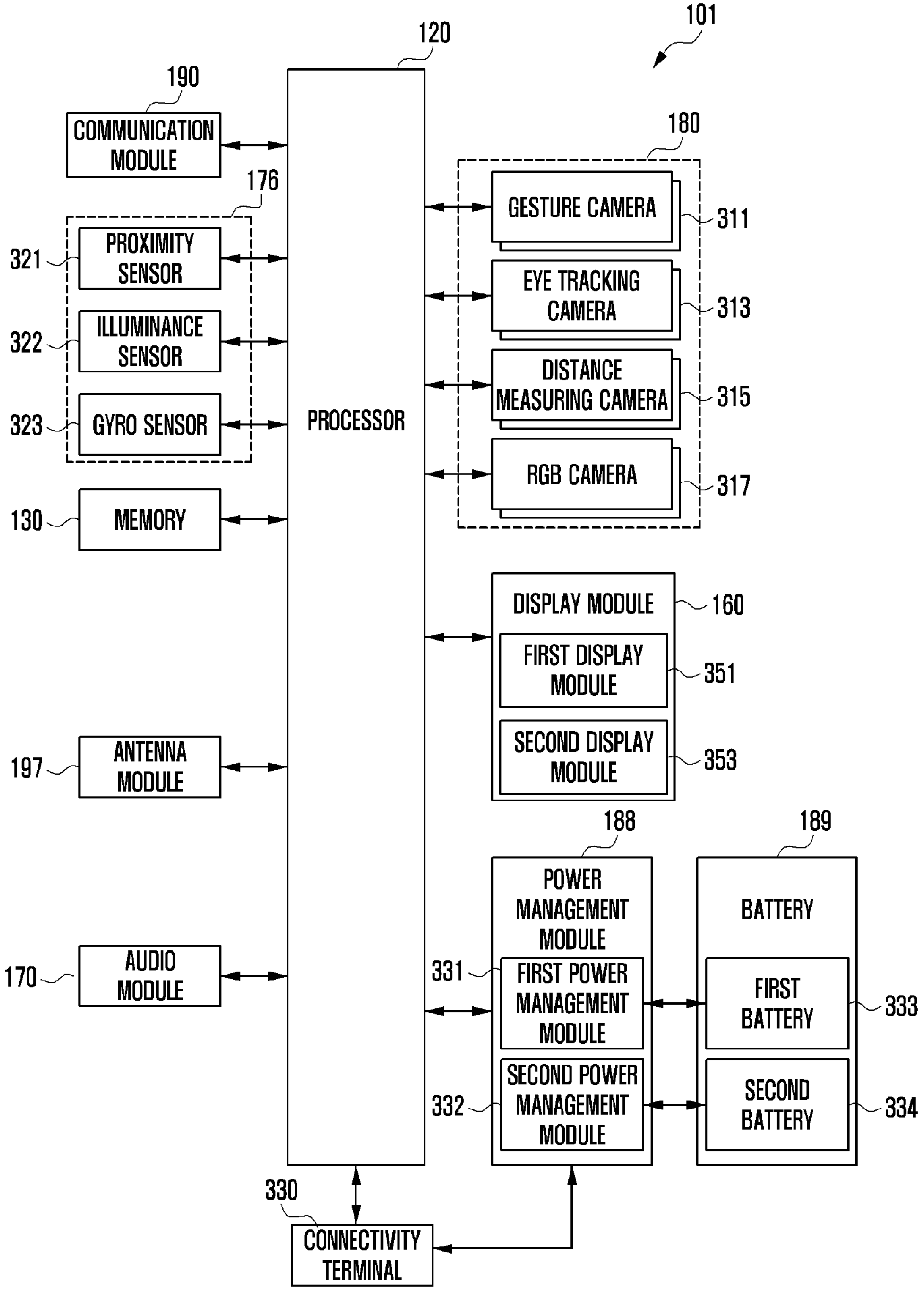
FIG. 1 is a diagram illustrating an electronic device including a plurality of antennas according to an embodiment.

FIG. 1 is a diagram illustrating an electronic device including a plurality of antennas according to an embodiment.

Referring to FIG. 1, the electronic device 101 may include a processor 120, a memory 130, a display module 160, an audio module 170, a sensor module 176, a camera module 180, a power management module 188, a battery 189, a communication module 190, and/or an antenna module 197. According to an embodiment, the electronic device 101 may be connected to an external electronic device through a connectivity terminal 330 (e.g., a universal serial bus (USB) type-C). For example, the power management module 188 of the electronic device 101 may receive power from the external electronic device through the connectivity terminal 330 to charge the battery 189. As another example, the processor 120 of the electronic device 101 may perform power line communication with the external electronic device through the connectivity terminal 330. According to an embodiment, the electronic device 101 may include a main body (e.g., a main body 223 of FIG. 2) and a support (e.g., a first support 221 and/or a second support 222 of FIG. 2). According to an embodiment, the components of the electronic device 101 may be arranged in the main body 223 or the supports 221 and 222.

According to an embodiment, the processor 120 may execute a program stored in the memory 130 to control at least one other component (e.g., a hardware or software component) and may perform a variety of data processing or operations. According to an embodiment, the processor 120 may provide an augmented reality service to the user. The processor 120 may output at least one virtual object through the display module 160 so that the at least one virtual object is additionally displayed in a real space corresponding to the viewing angle of the user wearing the electronic device 101.

According to an embodiment, the memory 130 may store a variety of data used by at least one component (e.g., the processor 120 or the sensor module 176) of the electronic device 101. The data may include, for example, input data or output data for software (e.g., a program) and instructions related thereto. The memory 130 may include a volatile memory or a non-volatile memory.

The display module 160 may visually provide information to the outside (e.g., the user) of the electronic device 101. The display module 160 may include a display, a hologram device, or a projector, and a control circuit for controlling a corresponding device. According to an embodiment, the display module 160 of the electronic device 101 may include at least one glass lens (e.g., a first glass lens (e.g., a first glass lens 220 of FIG. 2)) and/or a second glass lens (e.g., a second glass lens 230 of FIG. 2)). According to an embodiment, the first glass lens 220 may include at least a portion of a first display module 351, and the second glass lens 230 may include at least a portion of a second display module 353. For example, the first display module 351 and/or the second display module 353 may each include a display panel. The display panel may be made of a transparent element so that the user can perceive an actual space through the display module 160. The display module 160 may display at least one virtual object on at least a portion of the display panel so that the user wearing the electronic device 101 can see that the virtual object is added to the real space. For example, the viewing angle of the user may include an angle and/or range at which the user can recognize an object. According to an embodiment, the display module 160 may include a first display module 351 corresponding to the left eye of the user and/or a second display module 353 corresponding to the right eye of the user. According to an embodiment, the processor 120 may load configuration information (e.g., a resolution, a frame rate, the size of the display area, and/or the sharpness of the display area) related to the performance of the display module from the memory 130, and may adjust the performance of the display module 160 based on the above configuration information. According to an embodiment, the configuration information may be individually determined for each display panel included in the display module 160. For example, the first display panel corresponding to the left eye may be configured based on first configuration information, and the second display panel corresponding to the right eye may be configured based on second configuration information. According to another embodiment, the configuration information may differently configure at least a portion of one display panel included in the display module 160. For example, the electronic device 101 may differently configure at least one of the resolution, the frame rate, and/or the sharpness of the display module 160. According to an embodiment, the electronic device 101 may reduce power consumption by at least partially changing the configuration of the display module 160.

According to an embodiment, the audio module 170 may convert a sound into an electric signal or, conversely, convert an electric signal into a sound based on the control of the processor 120. For example, the audio module 170 may include speakers 232-1 and 232-2 of FIG. 2 and/or a microphone 241 of FIG. 2.

The sensor module 176 may detect an operating state (e.g., power or temperature) of the electronic device 101 or an external environmental state (e.g., a user state), and may generate an electrical signal or data value corresponding to the detected state. According to an embodiment, the sensor module 176 of the electronic device 101 may include a proximity sensor 321, an illuminance sensor 322, and/or a gyro sensor 323. According to an embodiment, the proximity sensor 321 may detect an object adjacent to the electronic device 101. The illuminance sensor 322 may measure the degree of brightness around the electronic device 101. According to an embodiment, the processor 120 may identify the brightness level around the electronic device 101 using the illuminance sensor 322 and may change brightness-related configuration information of the display module 160 based on the brightness level. For example, when the brightness around the electronic device 101 is brighter than predetermined brightness, the processor 120 may configure the brightness level of the display module 160 to be higher to increase user's visibility. According to an embodiment, the gyro sensor 323 may detect the posture and position of the electronic device 101. For example, the gyro sensor 323 may detect whether the electronic device 101 is properly worn on the user's head. As another example, the gyro sensor 323 may detect the electronic device 101 or a motion of a user wearing the electronic device 101.

The communication module 190 may support establishment of a direct (e.g., wired) communication channel or a wireless communication channel between the electronic device 101 and an external electronic device (e.g., a portable electronic device), and may support communication performance through the established communication channel. The communication module 190 may include one or more communication processors that operate independently of the processor 120 (e.g., an application processor) and support direct (e.g., wired) communication or wireless communication. According to an embodiment, the electronic device 101 may perform wireless communication with another electronic device through the communication module 190 (e.g., a wireless communication circuit). For example, the electronic device 101 may perform wireless communication with a portable electronic device (e.g., a smartphone) and may exchange or receive instructions therefrom. According to an embodiment, the electronic device 101 may be at least partially controlled by another external electronic device (e.g., a portable electronic device). For example, the electronic device 101 may perform at least one function under the control of another external electronic device.

The antenna module 197 may transmit or receive a signal or power to or from the outside (e.g., an external electronic device). According to an embodiment, the antenna module 197 may include an antenna including a conductor provided on a substrate (e.g., a printed circuit board (PCB)) or a radiator made of a conductive pattern. According to an embodiment, the antenna module 197 may include a plurality of antennas (e.g., a first antenna 410, a second antenna 420, a third antenna 430, and a fourth antenna 440 of FIG. 4). A signal or power may be transmitted or received between the communication module 190 and an external electronic device through the selected at least one antenna. According to some embodiments, other components (e.g., a radio frequency integrated circuit (RFIC)) other than the radiator may be additionally provided as a portion of the antenna module 197.

According to various embodiment, the electronic device 101 may change at least a portion of the configuration of the display panel based on the control of another electronic device connected in a wireless and/or wired manner. According to an embodiment, the electronic device 101 may transmit information (e.g., information on a distance to an object located in a real space, user's eye tracking information, or user's gesture information) related to the primary eye/auxiliary eye obtained through a camera (e.g., the camera module 180) of the electronic device 101 to another electronic device. The other electronic device may transmit, to the electronic device 101, configuration information of the display panel included in glass lenses (e.g., the first glass lens 220 and/or the second glass lens 230) corresponding to the detected primary or auxiliary eyes based on the information related to the primary eye/auxiliary eye received from the electronic device 101. The electronic device 101 may change at least a portion of the configuration of the display panel based on the configuration information of the display panel received from the other electronic device. For example, the configuration of the display panel may be changed to lower the quality of the display panel. Here, at least a portion of the configuration may be changed such that the user does not recognize the change. According to an embodiment, the electronic device 101 may reduce the resolution of the display panel, reduce the frame rate, or adjust the size and position of the display area of the display panel.

The camera module 180 may capture still images and moving images. According to an embodiment, the camera module 180 may include one or more lenses, image sensors, image signal processors, or flashes. According to an embodiment, the camera module 180 of the electronic device 101 may include a gesture camera 311, an eye tracking camera 313, a distance measuring camera 315 (a depth camera), and/or a red, green, and blue (RGB) camera 317. According to an embodiment, the gesture camera 311 may detect a user's movement. Recognition cameras 211-1 and 211-2 of FIG. 2 may include the gesture camera 311. For example, at least one gesture camera 311 may be disposed in the electronic device 101, and may detect a user's hand movement within a predetermined distance. The gesture camera 311 may include a simultaneous localization and mapping (SLAM) camera for recognizing information (e.g., location and/or direction) related to the surrounding space of the electronic device 101. A gesture recognition area of the gesture camera 311 may be configured based on a photographing range of the gesture camera 311. According to an embodiment, the eye tracking camera 313 (e.g., an eye tracking camera 212 of FIG. 2) may track the movement of the user's left eye and right eye. According to an embodiment, the processor 120 may identify the gaze direction of the left eye and the gaze direction of the right eye using the eye tracking camera 313. For example, the eye tracking camera 313 may include a first eye tracking camera 212-1 for identifying the gaze direction of the left eye and a second eye tracking camera 212-2 for identifying the gaze direction of the right eye. According to an embodiment, the processor 120 may determine the primary eye and the auxiliary eye based on the gaze direction of the left eye and the gaze direction of the right eye. According to an embodiment, the distance measuring camera 315 may measure a distance to an object located in front of the electronic device 101. A photographing camera 213 of FIG. 2 may include a distance measuring camera 315. The distance measuring camera 315 may include a time of flight (TOF) camera and/or a depth camera. According to an embodiment, the distance measuring camera 315 may photograph a front direction of the electronic device 101, and the eye tracking camera 313 may photograph a direction opposite the photographing direction of the distance measuring camera 315. According to another embodiment, the electronic device 101 may measure the distance to the object by using the distance measuring camera 315, and may change the configuration of the display panel when the distance is equal to or greater than a threshold value. For example, the electronic device 101 may maintain the display performance of the display panel when the distance to the object is equal to or less than the threshold value. According to an embodiment, the electronic device 101 may recognize one of objects located in the eye direction (e.g., field of view (FoV)) in which the user is looking with the eye tracking camera 313, and may calculate the depth of the distance to the object using the depth camera or measure the distance to the object through a TOF camera. According to an embodiment, the RGB camera 317 may detect information related to the color of the object and information on the distance to the object. According to an embodiment, the electronic device 101 may include one type of camera by integrating the distance measuring camera 315 and the RGB camera 317. For example, the photographing camera 213 of FIG. 2 may include the distance measuring camera 315 and/or the RGB camera 317. According to an embodiment, the gesture camera 311, the eye tracking camera 313, the distance measuring camera 315, and/or the RGB camera 317 included in the camera module 180 may be respectively included in the electronic device 101 or some of them may be implemented as an integrated camera. For example, the distance measuring camera 315 and the RGB camera 317 may be implemented as one integrated camera.

According to an embodiment, the power management module 188 may manage power supplied to the electronic device 101. The power management module 188 may include a plurality of power management modules (e.g., a first power management module 331 and a second power management module 332). At least one of the first power management module 331 or the second power management module 332 may be directly connected to the processor 120 to supply power. The at least some of the first power management module 331 or the second power management module 332 may receive power from an external electronic device through the connectivity terminal 330 (e.g., type-C) to charge the battery 189 or supply power to other components of the electronic device 101. According to an embodiment, the electronic device 101 may receive power from an external electronic device through a wireless charging method to charge the battery 188. According to an embodiment, the power management module 188 may be electrically connected to the components (e.g., the memory 130, the display module 160, the audio module 170, the sensor module 176, the camera module 180, and/or the communication module 190) of the electronic device 101. For example, the power management module 188 may provide power from the battery 189 to the components of the electronic device 101 based on the control of the processor 120. According to an embodiment, the electronic device 101 may receive power from a first battery 333 through the first power management module 331, and may receive power from a second battery 334 through the second power management module 332. According to an embodiment, the processor 120 may manage power consumption by at least partially changing the configuration of the display module 160 based on information obtained using the at least one camera 311, 313, 315, and 317 included in the camera module 180.

The battery 189 may supply power to at least one component of the electronic device 101. According to an embodiment, the battery 189 may include, for example, a non-rechargeable primary cell, a rechargeable secondary cell, or a fuel cell. According to an embodiment, the battery 189 may be charged by receiving power or may be discharged by providing power, under the control of the power management module 188. According to an embodiment, the battery 189 may include a plurality of batteries (e.g., a first battery 333 and a second battery 343). For example, the plurality of batteries (e.g., the first battery 333 and the second battery 343) may be arranged in the main body 223 and the support (e.g., the first support 221 and/or the second support 222). According to an embodiment, the first battery 333 may be arranged on the first support 221, and the second battery 343 may be arranged on the second support 222. According to another embodiment, although not shown, those skilled in the art will readily understand that the battery 189 may include one battery.

Figure 2:
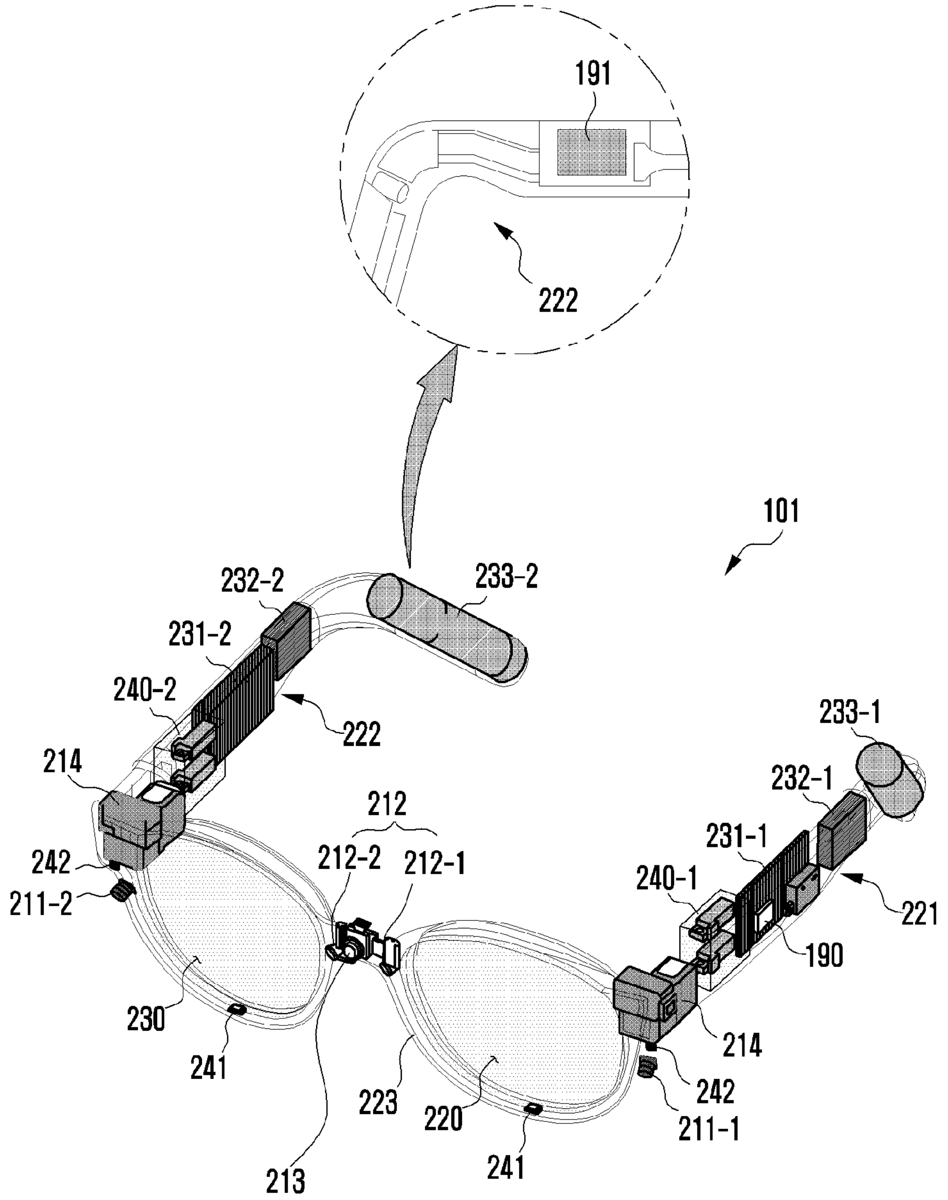
FIG. 2 is a diagram illustrating an electronic device including a plurality of antennas according to an embodiment.

FIG. 2 is a diagram illustrating an electronic device including a plurality of antennas according to an embodiment.

Referring to FIG. 2, the electronic device 101 according to an embodiment may include a display module 214 (e.g., the display module 160 of FIG. 1), a camera module (e.g., the camera module 180 of FIG. 1), an audio module (e.g., the audio module 170 of FIG. 1), a first support 221, and/or a second support 222. According to an embodiment, the display module 160 may include a first display (e.g., the first glass lens 220 (e.g., the first display module 351 of FIG. 1)) and/or a second display (e.g., the second glass lens 230 (e.g., the second display module 353 of FIG. 1)). According to an embodiment, the at least one camera may include the photographing camera 213 for photographing an image corresponding to a user's FoV and/or measuring a distance to an object, the eye tracking camera 212 for identifying the direction of a user's gaze, and/or the recognition camera 211-1 and 211-2 for recognizing a predetermined space. For example, the photographing camera 213 may photograph a front direction of the electronic device 101, and the eye tracking camera 212 may photograph a direction opposite the photographing direction of the photographing camera 213. For example, the eye tracking camera 212 may at least partially photograph both eyes of the user. According to an embodiment, the first support 221 and/or the second support 222 may include PCBs 231-1 and 231-2, speakers 232-1 and 232-2, and/or batteries 233-1 and 233-2.

According to an embodiment, the display module 160 (e.g., the display module 214 of FIG. 2) may be arranged in a main body (e.g., the main body 223 of FIG. 2) of the electronic device 101, and may include a condensing lens and/or a transparent waveguide in the glass lenses (e.g., the first glass lens 220 and the second glass lens 230). For example, the transparent waveguide may be positioned at least partially in a portion of the glass. According to an embodiment, light emitted from the display module 160 may be incident on one end of the glass lens through the first glass lens 220 and the second glass lens 230, and the incident light may be transmitted to the user through a waveguide tube and/or waveguide path (e.g., waveguide). The waveguide may be made of glass, plastic, or polymer, and may include a nano-pattern provided on one surface inside or outside, for example, a polygonal or curved grating structure. According to an embodiment, the incident light may be propagated or reflected inside the waveguide by the nano-pattern and may be provided to the user. According to an embodiment, the waveguide may include at least one of at least one diffractive element (e.g., a diffractive optical element (DOE) or a holographic optical element (HOE)) or a reflective element (e.g., a reflective mirror). According to an embodiment, the waveguide may guide display light emitted from a light source to the user's eyes using at least one diffractive element or reflective element.

Referring to FIG. 2, the first support 221 and/or the second support 222 may include PCBs 231-1 and 231-2 for transmitting electrical signals to each component of the electronic device 101, the speakers 232-1 and 232-2 for outputting audio signals, the batteries 233-1 and 233-2, and/or hinge portions 240-1 and 240-2 for at least partially coupling to the main body 223 of the electronic device 101. According to an embodiment, the speakers 232-1 and 232-2 may include the first speaker 232-1 for transmitting an audio signal to the user's left ear and the second speaker 232-2 for transmitting an audio signal to the user's right ear. The speakers 232-1 and 232-2 may be included in the audio module 170 of FIG. 1. According to an embodiment, the electronic device 101 may be provided with a plurality of batteries 233-1 and 233-2, and may supply power to the PCBs 231-1 and 231-2 through the power management module (e.g., the power management module 188 of FIG. 1).

Referring to FIG. 2, the electronic device 101 may include a microphone 241 for receiving a user's voice and ambient sounds. For example, the microphone 241 may be included in the audio module 170 of FIG. 1. The electronic device 101 may include at least one illumination light emitting diode (LED) 242 for increasing the accuracy of at least one camera (e.g., the photographing camera 213, the eye tracking camera 212, and/or the recognition cameras 211-1 and 211-2). For example, the illumination LED 242 may be used as an auxiliary means for increasing the accuracy when photographing the user's pupil using the eye tracking camera 212, and the illumination LED 242 may use an infrared (IR) LED of an infrared wavelength rather than a visible light wavelength. For another example, the illumination LED 242 may be used as the auxiliary means when photographing the user's gesture using the recognition cameras 211-1 and 211-2 or when it is not easy to detect a subject to be photographed in a dark environment or due to the mixing and reflected light of various light sources.

Referring to FIG. 2, the electronic device 101 according to an embodiment may include the main body 223 and the supports (e.g., the first support 221 and/or the second support 222), and the main body 223 and the supports 221 and 222 may be in an operatively connected state. For example, the main body 223 and the supports 221 and 222 may be operatively connected through the hinge portions 240-1 and 240-2. The main body 223 may be at least partially mounted on the user's nose, and may include the display module 160 and the camera module (e.g., the camera module 180 of FIG. 1). The supports 221 and 222 may include a support member mounted on the user's ear, and may include the first support 221 mounted on the left ear and/or the second support 222 mounted on the right ear. According to an embodiment, the first support 221 or the second support 222 may at least partially include the PCBs 231-1 and 231-2, the speakers 232-1 and 232-2, and/or the batteries 233-1 and 233-2 (e.g., the battery 189 of the FIG. 1 and the first battery 333 and/or the second battery 343 of FIG. 1). The battery may be electrically connected to the power management module (e.g., the power management module 188 of FIG. 1).

According to an embodiment, the display module 160 may include the first glass lens 220 and/or the second glass lens 230, and may provide visual information to the user through the first glass lens 220 and the second glass lens 230. The electronic device 101 may include the first glass lens 220 corresponding to the left eye and/or the second glass lens 230 corresponding to the right eye. According to an embodiment, the display module 160 may include a display panel and lens (e.g., glass). For example, the display panel may include a transparent material such as glass or plastic.

According to an embodiment, the display module 160 may be made of a transparent element, and the user may recognize an actual space of the rear surface of the display module 160 through the display module 160. The display module 160 may display the virtual object on at least a portion of the transparent element so that the user can see that the virtual object is added to at least a portion of the real space. The first glasses 220 and/or the second glasses 230 included in the display module 160 may include a plurality of glasses corresponding to both eyes of the user (e.g., the left eye and/or the right eye).

According to an embodiment, the electronic device 101 may include a virtual reality (VR) device. When the electronic device 101 is a VR device, the first glass lens 220 may be the first display module 351 and the second glass lens 230 may be the second display module 353.

According to an embodiment, the virtual object output through the display module 160 may include information related to an application program executed in the electronic device 101 and/or information related to an external object located in the real space corresponding to an area determined by a user's FoV. For example, the electronic device 101 may identify the external object included in at least a portion corresponding to the area determined by the user's FoV among image information related to the actual space obtained through the camera (e.g., the photographing camera 213) of the electronic device 101. The electronic device 101 may output (or display) the virtual object related to the external object identified in the at least a portion through the area determined by the user's FoV among the display areas of the electronic device 101. The external object may include an object existing in the real space. According to various embodiments, the display area in which the electronic device 101 displays the virtual object may include a portion (e.g., at least a portion of the display panel) of the display module (e.g., the first display module 351 or the second display module 353). According to an embodiment, the display area may be an area corresponding to at least a portion of the first glass lens 220 and/or the second glass lens 230.

According to an embodiment, the electronic device 101 may include the photographing camera 213 (e.g., an RGB camera) for photographing an image corresponding to the user's FoV and/or measuring a distance to the object, the eye tracking camera 212 for identifying a gaze direction of the user, and/or the recognition cameras 211-1 and 211-2 (e.g., the gesture camera) for recognizing a predetermined space. According to an embodiment, the electronic device 101 may measure the distance to the object located in the front direction of the electronic device 101 using the photographing camera 213. According to an embodiment, in the electronic device 101, a plurality of eye tracking cameras 212 may be arranged to correspond to both eyes of the user. For example, the eye tracking camera 212 may photograph a direction opposite the photographing direction of the photographing camera 213. The eye tracking camera 212 may detect the user's gaze direction (e.g., eye movement). For example, the eye tracking camera 212 may include a first eye tracking camera 212-1 for tracking the gaze direction of the user's left eye, and a second eye tracking camera 212-2 for tracking the gaze direction of the user's right eye. According to an embodiment, the electronic device 101 may detect a user gesture within a predetermined distance (e.g., a predetermined space) using the recognition cameras 211-1 and 211-2. For example, a plurality of recognition cameras 211-1 and 211-2 may be provided, and may be arranged on both sides of the electronic device 101. The electronic device 101 may detect an eye corresponding to the primary eye and/or the auxiliary eye from among the left eye and/or the right eye using at least one camera. For example, the electronic device 101 may detect the eye corresponding to the primary eye and/or the auxiliary eye based on the user's gaze direction with respect to the external object or the virtual object.

According to an embodiment, the photographing camera 213 may include a high resolution (HR) camera such as an HR camera and/or a photo video (PV) camera. According to an embodiment, the eye tracking camera 212 may detect the user's pupil to track the gaze direction, and may be utilized so that the center of the virtual object moves to correspond to the gaze direction. For example, the eye tracking camera 212 may be divided into the first eye tracking camera 212-1 corresponding to the left eye and the second eye tracking camera 212-2 corresponding to the right eye, and the performance and/or specifications thereof may be substantially the same. According to an embodiment, the recognition cameras 211-1 and 211-2 may be used for detecting a user's hand (gesture) and/or recognizing a space, and may include a global shutter (GS) camera. For example, the recognition cameras 211-1 and 211-2 may include a camera with less screen drag, such as a rolling shutter (RS) camera, in order to detect and track quick hand movements and/or minute finger movements.

According to an embodiment, the electronic device 101 may display a virtual object related to an augmented reality service together based on image information related to the real space obtained through the camera (e.g., the camera module 180 of FIG. 1) of the electronic device 101. According to an embodiment, the electronic device 101 may display the virtual object based on the display module (e.g., the first display module 351 corresponding to the left eye and/or the second display module 353 corresponding to the right eye) arranged to correspond to both eyes of the user. According to an embodiment, the electronic device 101 may display the virtual object based on predetermined configuration information (e.g., resolution, frame rate, brightness, and/or display area).

According to an embodiment, the electronic device 101 may operate a first display panel included in the first glass lens 220 and a second display panel included in the second glass lens 230 as independent components, respectively. For example, the electronic device 101 may determine the display performance of the first display panel based on first configuration information, and may determine the display performance of the second display panel based on second configuration information.

The number and position of at least one camera (e.g., the photographing camera 213, the eye tracking camera 212, and/or the recognition cameras 211-1 and 211-2) included in the electronic device 101 illustrated in FIG. 2 may not be limited. For example, based on the shape (e.g., shape or size) of the electronic device 101, the number and position of the at least one camera (e.g., the photographing camera 213, the eye tracking camera 212, and/or the recognition cameras 211-1 and 211-2) may vary.

According to an embodiment, the first support 221 may include the communication module 190. The communication module 190 may be arranged on the first PCB 231-1 disposed on the first support 221. According to an embodiment, the communication module 190 may be electrically connected to the first PCB 231-1. According to an embodiment, the communication module 190 may be electrically connected to at least a portion of a plurality of antennas (e.g., the antenna module 197 of FIG. 1) included in the electronic device 101. According to an embodiment, the communication module 190 may be electrically connected to the antenna (e.g., a third antenna 430 and/or a fourth antenna 440 of FIG. 4) disposed in the first support 221 among the plurality of antennas. According to an embodiment, the communication module 190 may receive power and/or a signal received by the antenna, from the plurality of antennas (e.g., the third antenna 430 and/or the fourth antenna 440 of FIG. 4). According to an embodiment, the communication module 190 may receive or radiate power and/or a signal from or to the outside (e.g., the second support 222 and/or an external electronic device) of the first support 221 using the plurality of connected antennas (e.g., the third antenna 430 and/or the fourth antenna 440 of FIG. 4). According to an embodiment, the communication module 190 may transmit a wireless signal and/or power to the outside (e.g., the external electronic device) and/or a relay module 191. According to an embodiment, the communication module 190 may receive a wireless signal and power from the outside (e.g., the external electronic device) and/or the relay module 191.

According to an embodiment, the second support 222 may include the relay module 191. The relay module 191 may be disposed on the second PCB 231-2 disposed in the second support 222. According to an embodiment, the relay module 191 may be electrically connected to the second PCB 231-2. According to an embodiment, the relay module 191 may be electrically connected to at least some of the plurality of antennas (e.g., the antenna module 197 of FIG. 1) included in the electronic device 101. According to an embodiment, the relay module 191 may be electrically connected to the antenna (e.g., the first antenna 410 and/or the second antenna 420 of FIG. 4) disposed in the second support 222 among the plurality of antennas. According to an embodiment, the relay module 191 may receive the power and signal received by the antenna from the plurality of antennas (e.g., the first antenna 410 and/or the second antenna 420 of FIG. 4). According to an embodiment, the relay module 191 may process a signal received from at least one of the plurality of connected antennas. According to an embodiment, the relay module 191 may receive a wireless signal and/or power from the outside (e.g., the external electronic device) and/or the communication module 190. According to an embodiment, the relay module 191 may transmit the wireless signal and/or the power to the communication module 190 and/or the external electronic device. The relay module 191 may radiate the signal received from the connected antenna to the outside using another antenna, or may radiate the signal processed by the relay module 191 to the outside through the antenna. According to an embodiment, the relay module 191 may receive or radiate power and/or a signal from or to the outside (e.g., the first support 221 and/or the external electronic device) of the second support 222 using the plurality of connected antennas (e.g., the first antenna 410 and/or the second antenna 420 of FIG. 4).

Figure 3A:
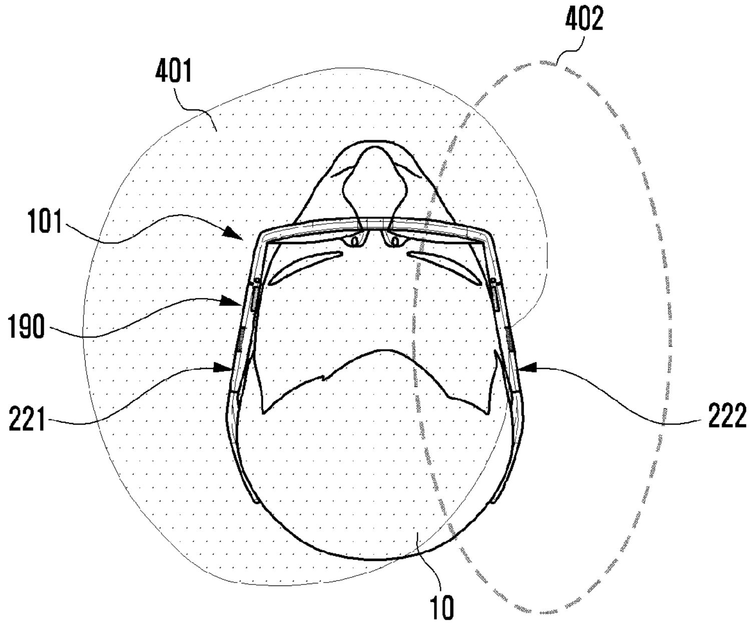
FIGS. 3A and 3B are diagrams illustrating a radiation area of a wireless signal radiated by an electronic device including a plurality of antennas according to an embodiment.
Figure 3B:
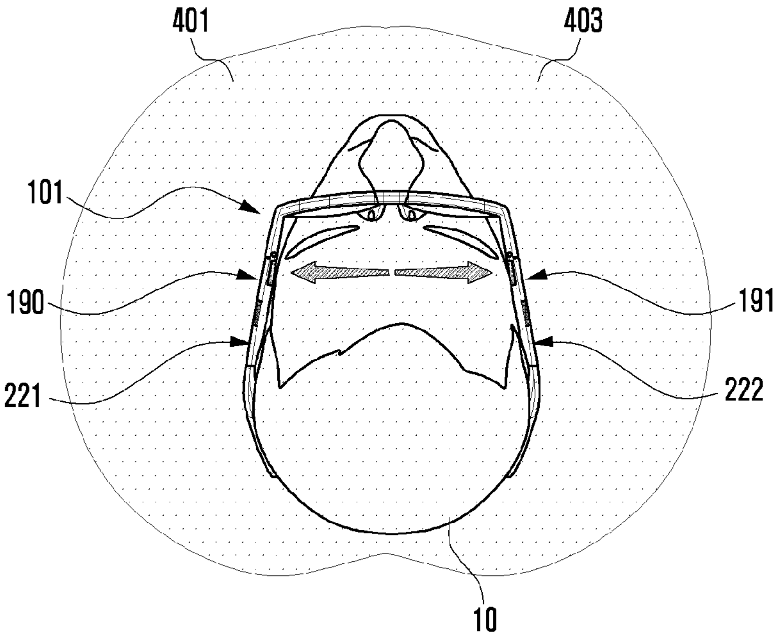

FIGS. 3A and 3B are diagrams illustrating a radiation area of a wireless signal radiated by an electronic device including a plurality of antennas according to an embodiment.

Referring to FIGS. 3A and 3B, the communication module 190 included in the electronic device 101 may transmit power and/or a wireless signal to the outside (e.g., an external electronic device). According to an embodiment, the communication module 190 may receive power and/or a wireless signal from the outside. According to various embodiments, the communication module 190 may be disposed on the first support 221. According to an embodiment, the first support 221 may be disposed on the left or right side of the electronic device 101, and for example, may be disposed to be positioned on the left or right side when the electronic device 101 is worn with respect to a user's head 10. According to various embodiments, the communication module 190 may radiate a wireless signal to the outside. According to an embodiment, the communication module 190 may be disposed on the first support 221 and may radiate a signal to the outside using at least one antenna (e.g., the third antenna 430 and/or the fourth antenna 440 of FIG. 4) connected to the communication module 190. According to an embodiment, the signal radiated from the communication module 190 may form a radiation area (e.g., a first radiation area 401).

Referring to FIG. 3A, the signal radiated from the communication module 190 may form the first radiation area 401. The first radiation area 401 may refer to a range in which the signal radiated from the communication module 190 can be effectively received. For example, the intensity of the signal radiated from the communication module 190 may decrease as a distance from a radiation point (e.g., the communication module 190) increases. According to an embodiment, the first radiation area 401 may be affected by the user's head 10. When the user wears the electronic device 101, the user's head 10 may act as an obstacle interfering with the signal radiated from the communication module 190, and the radiation area (e.g., the first radiation area 401) may be reduced from a range covered by the user's head 10. According to an embodiment, the signal radiated from the communication module 190 may form an area where a signal cannot be effectively received by the user's head 10, for example, a radiation shade 402.

Referring to FIG. 3B, the relay module 191 included in the electronic device 101 may transmit power and/or a wireless signal to the outside (e.g., an external electronic device). According to an embodiment, the relay module 191 may receive power and/or a wireless signal from the outside. According to various embodiments, the relay module 191 may be disposed on the second support 222. According to an embodiment, the second support 222 may be disposed on the left or right side of the electronic device 101, and for example, may be disposed to be positioned on the left or right side when the electronic device 101 is worn with respect to the user's head 10. According to various embodiments, the relay module 191 may radiate a wireless signal to the outside. According to an embodiment, the relay module 191 may be disposed on the second support 222 and may radiate a signal to the outside using at least one antenna (e.g., the first antenna 410 and/or the second antenna 420 of FIG. 4) connected to the relay module 191. According to an embodiment, the signal radiated from the relay module 191 may form a radiation area (e.g., a second radiation area 403). Referring to FIG. 3B, the signal radiated from the relay module 191 may form the second radiation area 403, and the entire area where the first radiation area 401 and the second radiation area 403 are formed may be formed to include a range of the area where the radiation shade 402 is formed. According to an embodiment, the second radiation area 403 may be formed in a range including at least a portion of the area of the radiation shade 402.

According to various embodiments, the communication module 190 may transmit a wireless signal to the relay module 191. According to an embodiment, the communication module 190 may transmit a signal to be radiated to the outside (e.g., an external electronic device) to the relay module 191. According to an embodiment, the relay module 191 may receive a wireless signal from the communication module 190. The signal that the relay module 191 receives from the communication module 190 may include a signal transmitted by the communication module 190 directly to the relay module 191 and/or a signal transmitted to the outside (e.g., an external electronic device). According to an embodiment, the relay module 191 may process the signal received from the communication module 190 and may radiate the processed signal to the outside. The processing of the signal may include, for example, amplification of the received signal and/or frequency conversion of the received signal. The signal radiated from the communication module 190 may be effectively transmitted to the second support 222 at a relatively close distance despite the radiation shade 402. Accordingly, the relay module 191 disposed on the second support 222 may receive a signal from the communication module 190, may amplify and/or frequency convert the received signal, and may radiate the amplified and converted signal to the outside.

Figure 4:
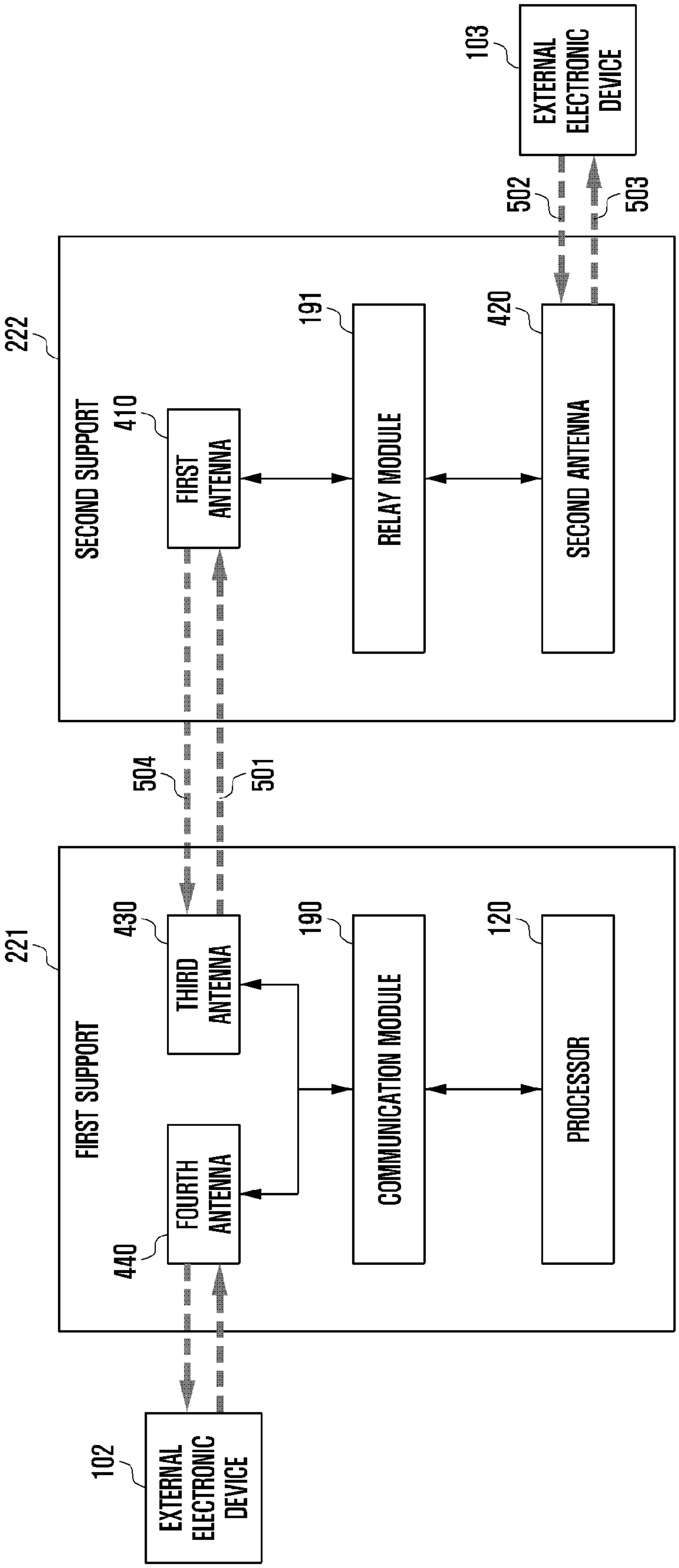
FIG. 4 is a diagram illustrating an electronic device performing communication using a plurality of antennas according to an embodiment.

FIG. 4 is a diagram illustrating an electronic device performing communication using a plurality of antennas according to an embodiment.

Referring to FIG. 4, the electronic device 101 may include the first support 221 (e.g., the first support 221 of FIG. 2) and the second support 222 (e.g., the second support 222 of FIG. 2). According to various embodiments, the first support 221 and the second support 222 may be spaced apart from each other. According to an embodiment, the first support 221 and the second support 222 may be connected to a main body (e.g., the main body 223 of FIG. 2), respectively, and may be arranged in different areas of the main body 223 to be spaced apart from each other.

According to various embodiments, the first support 221 may include the processor 120 (e.g., the processor 120 of FIG. 1), the communication module 190 (e.g., the communication module 190 of FIG. 1), and third and fourth antennas 430 and 440. According to an embodiment, components (e.g., the processor 120, the communication module 190, the third antenna 430, and/or the fourth antenna 440) included in the first support 221 may be electrically and operatively connected to each other. According to an embodiment, the electronic device 101 may include at least one of the third antenna 430 and the fourth antenna 440.

According to an embodiment, the third antenna 430 and the fourth antenna 440 may perform substantially the same operation.

According to various embodiments, the communication module 190 may include a software and/or hardware module (e.g., a communication processor (CP)) for wirelessly communicating with a network or an external electronic device (e.g., the external electronic device). The communication module 190 may communicate with an external electronic device through a wireless communication network. The wireless communication network may include a short-range wireless communication (e.g., Bluetooth and/or wireless fidelity (Wi-Fi) direct) network. According to various embodiments, the communication module 190 may transmit/receive a signal and/or power through a plurality of antennas (e.g., the third antenna 430 and/or the fourth antenna 440). The communication module 190 may generate and transmit a signal under the control of the processor 120, and may receive a signal and process the received signal.

According to various embodiments, the third antenna 430 may transmit/receive power and/or a signal. According to an embodiment, a signal that the third antenna 430 can transmit or receive may be a short-range wireless communication (e.g., Bluetooth and/or Wi-Fi) signal. According to an embodiment, the third antenna 430 may transmit or receive a signal or power to or from the outside (e.g., the outside of the first support 221) under the control of the communication module 190 and/or the processor 120. The signal transmitted and received by the third antenna 430 may include signals of various frequency bands (e.g., 2 GHz, 2.4 GHz, 5 GHz, and/or 6 GHz). According to an embodiment, the third antenna 430 may include a plurality of antenna elements. According to an embodiment, the third antenna 430 may include a directional antenna. For example, the third antenna 430 may have a reflector attached thereto to radiate a beam including a signal or power in a specific azimuth, so that the signal or power may be propagated in a predetermined direction. According to an embodiment, the third antenna 430 may be disposed in a location (e.g., an area opposite the second support 222 or an area facing the user's head 10 of FIGS. 3A and 3B) suitable for transmitting and receiving signals to and from other components (e.g., the first antenna 410) in the electronic device 101. According to an embodiment, the signal that the third antenna 430 radiates or receives may be a signal of a different frequency band (e.g., 2 GHz) from the signal emitted or received by the fourth antenna 440. According to an embodiment, the third antenna 430 may radiate a signal (e.g., a first signal 501) toward the first antenna 410 under the control of the communication module 190 and/or the processor 120. According to an embodiment, the third antenna 430 may receive a signal (e.g., a fourth signal 503) radiated from the first antenna 410 and may transmit the received signal to the communication module 190.

According to various embodiments, the fourth antenna 440 may transmit/receive power and/or signals. According to an embodiment, a signal that the fourth antenna 440 can transmit or receive may be a short-range wireless communication (e.g., Bluetooth and/or Wi-Fi) signal. According to an embodiment, the fourth antenna 440 may transmit or receive a signal or power to or from the outside (e.g., the outside of the first support 221) under the control of the communication module 190 and/or the processor 120. The signal transmitted and received by the fourth antenna 440 may include signals of various frequency bands (e.g., 2.4 GHz, 5 GHz, and/or 6 GHz). According to an embodiment, the fourth antenna 440 may include a plurality of antenna elements. According to an embodiment, the fourth antenna 440 may be disposed in a location (e.g., an area facing the outside of the electronic device 101) suitable for transmitting or receiving a signal to or from another electronic device (e.g., the external electronic device 102 and/or the first radiation area 401 of FIGS. 3A and 3B) outside the electronic device 101.

According to various embodiments, the second support 222 may include the processor 120 (e.g., the processor 120 of FIG. 1), the relay module 191 (e.g., the relay module 191 of FIG. 1), the first antenna 410, and the second antenna 420. According to an embodiment, the components (e.g., the processor 120, the relay module 191, the first antenna 410, and/or the second antenna 420) included in the second support 222 may be electrically and operatively connected to each other. According to an embodiment, the electronic device 101 may include at least one of the first antenna 410 and the second antenna 420. According to an embodiment, the first antenna 410 and the second antenna 420 may perform the same operation.

According to various embodiments, the first antenna 410 may transmit/receive power and/or signals. According to an embodiment, a signal that the first antenna 410 can transmit or receive may be a short-range wireless communication (e.g., Bluetooth and/or Wi-Fi) signal. According to an embodiment, the first antenna 410 may be electrically connected to the relay module 191 to transmit the signal received from the relay module 191 to the outside (e.g., the outside of the second support 222) or transmit the signal received from the outside to the relay module 191. The signal transmitted and received by the first antenna 410 may include signals of various frequency bands (e.g., 2 GHz, 2.4 GHz, 5 GHz, and/or 6 GHz). According to an embodiment, the first antenna 410 may include a plurality of antenna elements. According to an embodiment, the first antenna 410 may include a directional antenna. For example, the first antenna 410 may have a reflector attached thereto to radiate a beam including a signal or power in a specific azimuth, so that the signal or power may be propagated in a predetermined direction. According to an embodiment, the first antenna 410 may be disposed in a location (e.g., an area opposite the first support 221 or an area facing the user's head 10 of FIGS. 3A and 3B) suitable for transmitting or receiving a signal to or from another component (e.g., the third antenna 410) in the electronic device 101. According to an embodiment, the signal that the first antenna 410 radiates or receives may be a signal having a frequency of a band different from that of a signal that the second antenna 420 (e.g., 2 GHz) radiates or receives. According to an embodiment, the first antenna 410 may receive a signal (e.g., the first signal 501) radiated from the third antenna 430 and may transmit the received signal to the relay module 191. According to an embodiment, the first antenna 410 may radiate a signal (e.g., a fourth signal 504) received from the relay module 191 toward the third antenna 430.

According to various embodiments, the second antenna 420 may transmit/receive power and/or signals. According to an embodiment, the signal that the second antenna 420 can transmit or receive may be a short-range wireless communication (e.g., Bluetooth and/or Wi-Fi) signal. According to an embodiment, the first antenna 410 may be electrically connected to the relay module 191 to transmit a signal received from the relay module 191 to the outside (e.g., the outside of the second support 222) or to transmit a signal received from the outside to the relay module 191. The signal transmitted and received by the second antenna 420 may include signals of various frequency bands (e.g., 2.4 GHz, 5 GHz, and/or 6 GHz). According to an embodiment, the second antenna 420 may include a plurality of antenna elements. According to an embodiment, the second antenna 420 may be disposed in a location (e.g., an area facing the outside of the electronic device 101) suitable for transmitting or receiving a signal to or from another electronic device (e.g., the external electronic device 103 and/or the second radiation area 402 of FIGS. 3A and 3B) outside the electronic device 101. According to an embodiment, the second antenna 420 may radiate the signal (e.g., the second signal 502) received from the relay module 191, toward the outside (e.g., the external electronic device 103). According to an embodiment, the second antenna 420 may receive the signal (e.g., the third signal 503) radiated from the external electronic device 103 and may transmit the received signal to the relay module 191.

According to various embodiments, the relay module 191 may relay the signal (e.g., the first signal 501 and/or the third signal 503) received from the outside (e.g., the outside of the second support 222). According to an embodiment, the relay module 191 may relay the signal (e.g., the first signal 501) received from the communication module 190 to radiate the relayed signal to the external electronic device 103. According to an embodiment, the relay module 191 may relay the signal (e.g., the third signal 503) received from the external electronic device 103 to radiate the relayed signal to the communication module 190.

According to various embodiments, the relay module 191 may receive a wireless signal (e.g., the first signal 501 or the third signal 503) using a plurality of antennas (e.g., the first antenna 410 and/or the second antenna 420). According to an embodiment, the relay module 191 may receive the first signal 501 from the communication module 190 through the first antenna 410. The first signal 501 received by the relay module 191 may be a signal radiated by the third antenna 430 under the control of the communication module 190. According to an embodiment, the relay module 191 may receive the third signal 503 from the external electronic device 103 through the second antenna 420. According to an embodiment, the third signal 503 may be a signal for the electronic device 101 to communicate with the external electronic device 103.

According to various embodiments, the relay module 191 may radiate a wireless signal (e.g., the fourth signal 504 or the second signal 502) using the plurality of antennas (e.g., the first antenna 410 and/or the second antenna 420. According to an embodiment, the relay module 191 may radiate the fourth signal 504 to the communication module 190 through the first antenna 410. According to an embodiment, the relay module 191 may radiate the second signal 502 to the external electronic device 103 through the second antenna 420. According to an embodiment, the second signal 502 may be a signal for the electronic device 101 to communicate with the external electronic device 103.

According to various embodiments, the relay module 191 may process the received signal (e.g., the first signal 501 and/or the third signal 503). According to an embodiment, the relay module 191 may generate the second signal 502 by processing the first signal 501. The relay module 191 may radiate the generated second signal 502 to the outside (e.g., the external electronic device 103) using the second antenna 520. According to an embodiment, the relay module 191 may generate the fourth signal 504 by processing the third signal 503. The relay module 191 may radiate the generated fourth signal 504 to the outside (e.g., the communication module 190 or the third antenna 430) of the second support 222 using the second antenna 520. According to various embodiments, the relay module 191 may include components such as a duplexer, a low noise amplifier (LNA), a power amplifier module (PAM), and/or a converter. According to an embodiment, the duplexer may separate the first signal 501 received from the first antenna 410 and the fourth signal 504 radiated from the first antenna 410. According to an embodiment, the duplexer may separate the third signal 503 received from the second antenna 420 and the second signal 502 radiated from the second antenna 420. The LNA and the PAM may amplify the first signal 501 and/or the third signal 503, respectively.

According to various embodiments, the relay module 191 may amplify the received signal (e.g., the first signal 501 and/or the third signal 503). According to an embodiment, the relay module 191 may amplify the first signal 501 to generate the second signal 502. The first signal 501 received from the first antenna 410 may be in a relatively attenuated state due to the influence of a radiation shade (e.g., the radiation shade 402 of FIGS. 3A and 3B) caused by the user's head (e.g., the user's head 10 of FIGS. 3A and 3B). According to an embodiment, the relay module 191 may amplify the first signal 501 in the attenuated state into the second signal 502. According to an embodiment, the relay module 191 may amplify the third signal 503 to generate the fourth signal 504. The fourth signal 504 should be amplified in consideration of being attenuated due to the influence of the user's head 10 while being transmitted to the communication module 190. According to an embodiment, the relay module 191 may amplify the first signal 501 using the duplexer, the LNA, and/or the PAM and may radiate the amplified signal (e.g., the second signal 502) to the external electronic device 103. According to an embodiment, the relay module 191 may amplify the third signal 503 using the duplexer, the LNA and/or the PAM and may transmit the amplified signal (e.g., the fourth signal 504) to the third antenna 430.

According to various embodiments, the relay module 191 may frequency-convert the received signal (e.g., the first signal 501 and/or the third signal 503). According to an embodiment, the relay module 191 may generate the second signal 502 by frequency-converting the first signal 501. According to an embodiment, the relay module 191 may generate the fourth signal 504 by frequency-converting the third signal 503. According to an embodiment, a signal (e.g., the first signal 501 and/or the fourth signal 504) transmitted/received by the first antenna 410 to/from the communication module 190 and/or the third antenna 430 may have a frequency (e.g., 2 GHz) of a band different from a frequency band (e.g., 2.4 GHz, 5 GHz, and/or 6 GHz) of a signal transmitted/received by the second antenna 420 to/from the external electronic device 103. The signals (e.g., the first signal 501 and/or the fourth signal 504) transmitted/received by the first antenna 410 and the third antenna 430 may include frequencies of different bands, so that the interference with the signal (e.g., the second signal 502 and/or the third signal 503) transmitted/received by the second antenna 420 or the signal for the communication module 190 to communicate with the outside (e.g., the external electronic device 102) may be reduced, thereby improving the communication quality. According to an embodiment, the relay module 191 may frequency-convert the first signal 501 using the converter to generate the second signal 502 of a high frequency band. According to an embodiment, the relay module 191 may frequency-convert the third signal 503 using the converter to generate the fourth signal 504 of a low frequency band. According to an embodiment, the relay module 191 may generate the second signal 502 by simultaneously performing amplification and frequency conversion of the first signal 501. According to an embodiment, the relay module 191 may generate the fourth signal 504 by simultaneously performing amplification and frequency conversion of the third signal 503. According to an embodiment, the relay module 191 may bypass the received first signal 501 and/or third signal 503, and may radiate the first signal 501 and/or the third signal 503 as is without processing the first signal 501 and/or the third signal 503. According to an embodiment, the second signal 502 generated by the relay module 191 may be a signal obtained by relaying the first signal 501. According to an embodiment, the fourth signal 504 generated by the relay module 191 may be a signal obtained by relaying the third signal 503.

According to various embodiments, the processor 120 (e.g., the processor 120 of FIG. 1) may process data in the electronic device 101, may control at least one other component related to the function of the electronic device 101, and may perform data processing and calculations necessary to perform the function. The processor 120 may be electrically and/or functionally connected to the component of the electronic device 101 such as the communication module 190. According to various embodiments, there will be no limitations on the arithmetic and data processing functions that the processor 120 can implement within the electronic device 101, but in various embodiments disclosed in this document, an operation of performing communication with an external electronic device (e.g., the external electronic device 102 or 103) using the communication module 190 will be mainly described.

According to various embodiments, the processor 120 may perform communication with the external electronic device 102 by controlling the communication module 190. According to an embodiment, the processor 120 may be disposed on the first support 221. The processor 120 may control the communication module 190 to communicate with the outside of the first support 221 (e.g., the external electronic device 102 and/or the relay module 191). According to an embodiment, the processor 120 may control the communication module 190 to transmit/receive a signal and/or power to/from the external electronic device 102. According to an embodiment, the signal transmitted/received between the external electronic device 102 and the processor 120 may be a short-range wireless communication (e.g., Bluetooth and/or Wi-Fi) signal. According to an embodiment, the processor 120 may transmit/receive a wireless signal to/from the external electronic device 102 using the fourth antenna 440. According to an embodiment, signals transmitted and received by the processor 120 using the fourth antenna 440 may include signals of various bands (e.g., 2.4 GHz, 5 GHz, and/or 6 GHz). According to various embodiments, the processor 120 may control the communication module 190 to transmit/receive signals (e.g., the first signal 501 and/or the fourth signal 504) to/from the relay module 191. According to an embodiment, the processor 120 may generate the first signal 501 and may radiate the first signal 501 using the communication module 190 and the third antenna 430. The first signal 501 radiated by the third antenna 430 may be radiated toward the first antenna 410. According to an embodiment, the first signal 501 may be a signal for the electronic device 101 to communicate with the outside (e.g., the external electronic device 103). According to an embodiment, the first signal 501 generated by the processor 120 may include a frequency (e.g., 2.4 GHz, 5 GHz, and/or 6 GHz) of the same band as a signal transmitted and received to and from the external electronic device 102. According to an embodiment, the first signal 501 generated by the processor 120 may include a frequency (e.g., 2 GHz) of a band different from that of a signal transmitted and received to and from the external electronic device 102.

According to various embodiments, the processor 120 may control the communication module 190 to communicate with the relay module 191. According to an embodiment, the processor 120 may control the communication module 190 to transmit/receive a signal and/or power to/from the relay module 191. According to an embodiment, the signal (e.g., the first signal 501 and/or the fourth signal 504) transmitted and received between the relay module 191 and the processor 120 may be a short-range wireless communication (e.g., Bluetooth and/or or Wi-Fi) signal. According to an embodiment, the processor 120 may transmit/receive a wireless signal (e.g., the first signal 501 and/or the fourth signal 504) to/from the relay module 191 using the first antenna 410. According to an embodiment, the processor 120 may receive the fourth signal 504 from the relay module 191 by controlling the communication module 190. According to an embodiment, the processor 120 may receive the fourth signal 504 using the third antenna 430. According to various embodiments, the processor 120 may control the communication module 190 to convert the received fourth signal 504. According to an embodiment, the fourth signal 504 may include a frequency (e.g., 2.4 GHz, 5 GHz, and/or 6 GHz) of the same band as a signal that the processor 120 transmits and receives to and from the external electronic device 102. According to an embodiment, the fourth signal 504 received by the processor 120 may include a frequency (e.g., 2 GHz) different from a signal transmitted and received to and from the external electronic device 102. According to an embodiment, the processor 120 may frequency-convert the received fourth signal 504 by controlling the communication module 190. The processor 120 may frequency-convert the fourth signal 504 having a relatively low frequency band (e.g., 2 GHz) into a relatively high frequency band (e.g., 2.4 GHz, 5 GHz, and/or 6 GHz).

Figure 5:
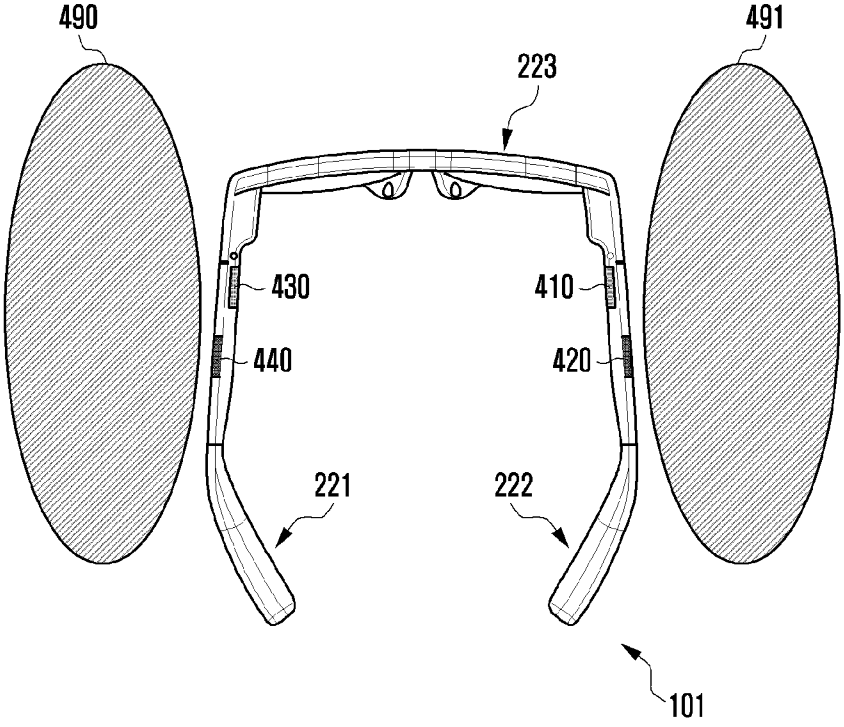
FIG. 5 is a diagram illustrating an arrangement position and a radiation area of a plurality of antennas according to an embodiment.

FIG. 5 is a diagram illustrating an arrangement position and a radiation area of a plurality of antennas according to an embodiment.

Referring to FIG. 5, the electronic device 101 may include the main body 223, the first support 221, and the second support 222. According to an embodiment, the first support 221 and the second support 222 may be spaced apart from each other and may be connected to the main body 223, respectively. According to various embodiments, the electronic device 101 may include a plurality of antennas, for example, the first antenna 410 (e.g., the first antenna 410 of FIG. 4), the second antenna 420 (e.g., the second antenna 420 of FIG. 4), the third antenna 430 (e.g., the third antenna 430 of FIG. 4), and/or the fourth antenna 440 (e.g., the fourth antenna 440 of FIG. 4). According to an embodiment, the first antenna 410 and/or the second antenna 420 may be disposed on the second support 222. According to an embodiment, the third antenna 430 and/or the fourth antenna 440 may be disposed on the first support 221.

According to various embodiments, the first antenna 410 and the third antenna 430 may transmit and receive a wireless signal and/or power to and from each other. According to an embodiment, the third antenna 430 may radiate a first signal (e.g., the first signal 501 of FIG. 4) to the first antenna 410 under the control of the communication module 190. According to an embodiment, the first antenna 410 may receive the first signal 501 radiated from the third antenna 430, and may transmit the received signal to a relay module (e.g., the relay module 191 of FIG. 4) disposed on the second support 222. According to an embodiment, the first antenna 410 and the third antenna 430 may be disposed in a location suitable for transmitting and receiving signals to and from each other, respectively. According to an embodiment, the first antenna 410 may be disposed on at least a partial area of the second support 222 facing the first support 221. According to an embodiment, the third antenna 430 may be disposed on at least a partial area of the first support 221 facing the second support 222. According to an embodiment, the first antenna 410 and the third antenna 430 may be respectively disposed in a direction to face each other.

According to various embodiments, the second antenna 410 and the fourth antenna 430 may transmit/receive a wireless signal and/or power to/from the outside (e.g., the external electronic device 102 of FIG. 4). According to an embodiment, the second antenna 430 may radiate the second signal (e.g., the second signal 502 of FIG. 4) to the outside (e.g., the external electronic device 103 of FIG. 4) under the control of the communication module 190. According to an embodiment, the second antenna 420 may radiate the second signal 502 received from the relay module 191 to the outside of the electronic device 101. According to an embodiment, the fourth antenna 440 may radiate the signal received from the communication module 190 to the outside of the electronic device 101. According to an embodiment, the second antenna 420 and the fourth antenna 440 may be disposed in a location suitable for transmitting and receiving a signal to and from the outside (e.g., the external electronic device 102), respectively. According to an embodiment, the second antenna 420 may be disposed on at least a partial area of the second support 222 facing the outside of the electronic device 101. According to an embodiment, the fourth antenna 440 may be disposed on at least a partial area of the first support 221 facing the outside of the electronic device 101. According to an embodiment, the fourth antenna 440 may radiate a wireless signal to communicate with the external electronic device 102 under the control of the communication module 190 to form a first radiation area 490 (e.g., the first radiation area 401 of FIGS. 3A and 3B). The first radiation area 490 may be formed, for example, over a reception distance at which the fourth signal 504 can be effectively identified. According to an embodiment, the second antenna 420 may radiate the second signal 502 to form a second radiation area 491 (e.g., the second radiation area 403 of FIGS. 3A and 3B). The second radiation area 491 may be formed, for example, over a reception distance at which the second signal 502 can be effectively identified. The second radiation area 491 may be formed to include at least a partial area of a radiation shade (e.g., the radiation shade 402 of FIGS. 3A and 3B) by the user's head (e.g., the user's head 10 of FIGS. 3A and 3B).

Figure 6:
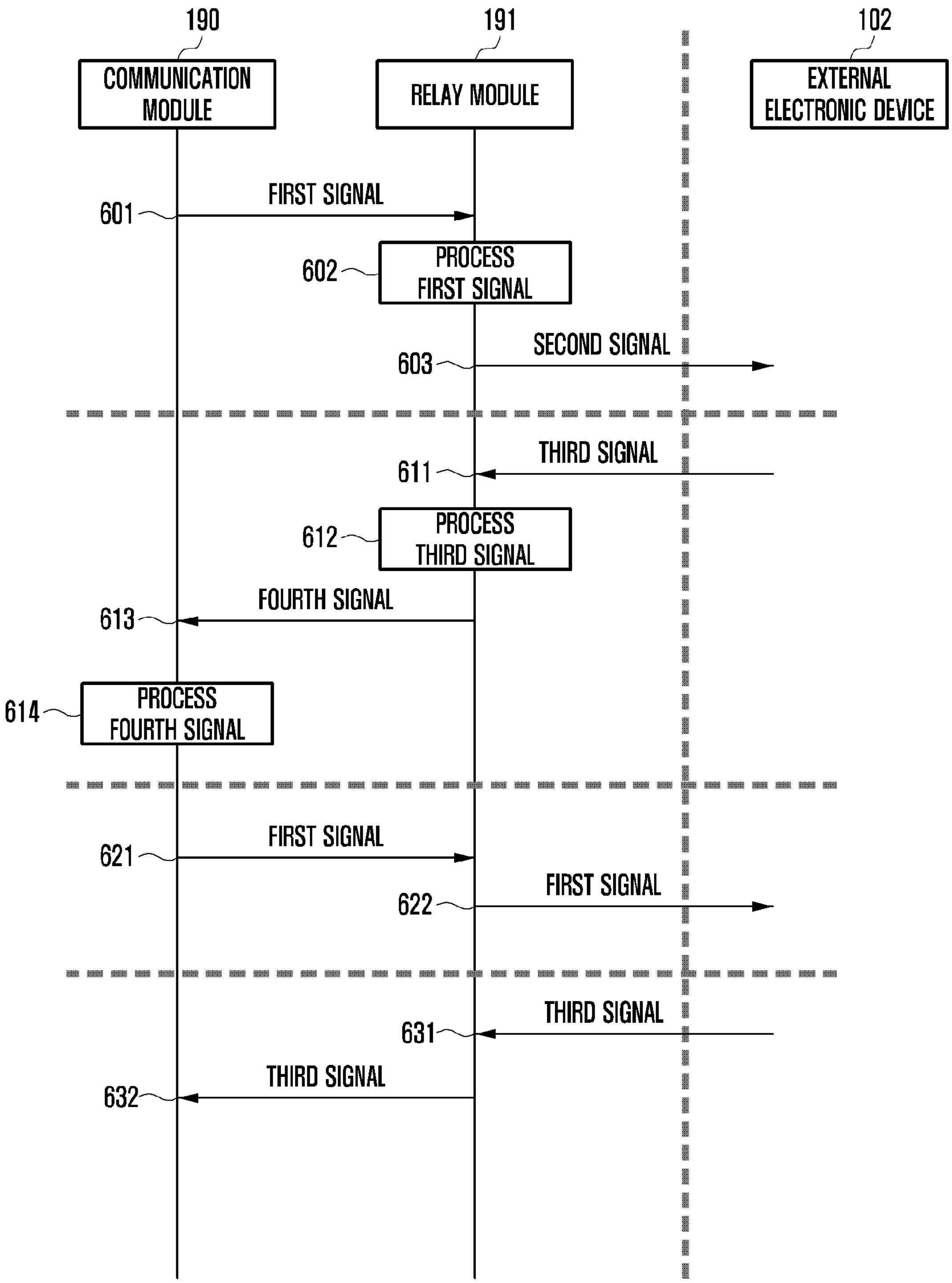
FIG. 6 is a flowchart illustrating an operation of an electronic device performing wireless communication according to an embodiment.

FIG. 6 is a flowchart illustrating an operation of an electronic device performing wireless communication according to an embodiment.

Referring to FIG. 6, each operation of the electronic device 101 may be described as each operation of the communication module 190 and/or the relay module 191. In addition, each operation of the communication module 190 may be understood as an operation performed under the control of a processor (e.g., the processor 120 of FIG. 4).

Referring to operation 601, the communication module 190 may radiate a first signal (e.g., the first signal 501 of FIG. 4) to the relay module 191. According to an embodiment, the processor 120 (e.g., the processor 120 of FIG. 1) may generate the first signal 501, and the communication module 190 may radiate the first signal 501 received from the processor 120 using a third antenna (e.g., the third antenna 430 of FIG. 4). The first signal 501 radiated by the third antenna 430 may be radiated toward a first antenna (e.g., the first antenna 410 of FIG. 4). According to an embodiment, the first signal 501 may be a signal for the electronic device 101 to communicate with the outside (e.g., the external electronic device 102). According to an embodiment, the first signal 501 generated by the processor 120 may include a frequency (e.g., 2.4 GHz, 5 GHz, and/or 6 GHz) of the same band as a signal transmitted and received to and from the external electronic device 102. According to an embodiment, the first signal 501 generated by the processor 120 may include a frequency (e.g., 2 GHz) of a band different from that of the signal transmitted and received to and from the external electronic device 102. According to an embodiment, the relay module 191 may use a plurality of antennas (e.g., the first antenna 410 of FIG. 4) to receive a wireless signal (e.g., the first signal 501 of FIG. 4) from the communication module 190.

Referring to operation 602, the relay module 191 may process the received first signal 501. According to various embodiments, the relay module 191 may process the received signal (e.g., the first signal 501 and/or the third signal 503). According to an embodiment, the relay module 191 may generate the second signal 502 by processing the first signal 501.

According to various embodiments, the relay module 191 may amplify the received first signal 501. According to an embodiment, the relay module 191 may amplify the first signal 501 to generate the second signal 502. The first signal 501 received from the first antenna 410 may be in a relatively attenuated state due to the influence of a radiation shade (e.g., the radiation shade 402 of FIGS. 3A and 3B) caused by the user's head (e.g., the user's head 10 of FIGS. 3A and 3B). According to an embodiment, the relay module 191 may amplify the first signal 501 in the attenuated state into the second signal 502. According to an embodiment, the relay module 191 may amplify the first signal 501 using a duplexer, an LNA, and/or a PAM.

According to various embodiments, the relay module 191 may frequency-convert the received first signal 501. According to an embodiment, the relay module 191 may generate the second signal 502 by frequency-converting the first signal 501. According to an embodiment, the first signal 501 may have a frequency (e.g., 2 GHz) of a band different from a frequency band (e.g., 2.4 GHz, 5 GHz, and/or 6 GHz) of a signal (e.g., the second signal 502 and/or the third signal 503 of FIG. 4) transmitted/received by a second antenna (e.g., the second antenna 420 of FIG. 4) to/from the external electronic device 103. The first signal 501 may include a frequencies of different bands so that the interference with the signal (e.g., the second signal 502 and/or the third signal 503) transmitted/received by the second antenna 420 or the signal for the communication module 190 to communicate with the outside (e.g., the external electronic device 102) may be reduced, thereby improving the communication quality. According to an embodiment, the relay module 191 may frequency-convert the first signal 501 using a converter to generate the second signal 502 of a high frequency band. According to an embodiment, the relay module 191 may generate the second signal 502 by simultaneously performing amplification and frequency conversion of the first signal 501.

Referring to operation 603, the relay module 191 may radiate the second signal 502 to the outside. According to various embodiments, the relay module 191 may radiate the second signal 502 to the outside (e.g., the external electronic device 102) using the second antenna (e.g., the second antenna 420 of FIG. 4). According to an embodiment, the second antenna 420 may radiate the second signal 502 received from the relay module 191 to the outside of the electronic device 101.

Referring to operation 611, the relay module 191 may receive a third signal (e.g., the third signal 503 of FIG. 4) from the external electronic device 102. According to an embodiment, the relay module 191 may receive the third signal 503 from the external electronic device 102 through the second antenna (e.g., the second antenna 420 of FIG. 4). According to an embodiment, the third signal 503 may be a signal for the electronic device 101 to communicate with the external electronic device 102.

Referring to operation 612, the relay module 191 may process the third signal 503. According to various embodiments, the relay module 191 may generate a fourth signal (e.g., the fourth signal 504 of FIG. 4) by processing the third signal 503. According to an embodiment, the relay module 191 may amplify the third signal 503 to generate the fourth signal 504. The fourth signal 504 should be amplified in consideration of being attenuated due to the influence of the user's head 10 while being transmitted to the communication module 190. According to an embodiment, the relay module 191 may amplify the third signal 503 using a duplexer, an LNA, and/or a PAM to generate an amplified signal (e.g., the fourth signal 504).

According to various embodiments, the relay module 191 may frequency-convert the third signal 503. According to an embodiment, the relay module 191 may generate the fourth signal 504 by frequency-converting the third signal 503. According to an embodiment, the signal (e.g., the fourth signal 504) transmitted/received by the first antenna 410 to/from the communication module 190 may have a frequency of a band (e.g., 2 GHz) different from a frequency band (e.g., 2.4 GHz, 5 GHz, and/or 6 GHz) of the third signal 503. The fourth signal 504 may include frequencies of different bands, so that the interference with the second signal 502 and/or the third signal 503 or the signal for the communication module 190 to communicate with the outside (e.g., the external electronic device 102) may be reduced, thereby improving the communication quality. According to an embodiment, the relay module 191 may frequency-convert the third signal 503 using the converter to generate the fourth signal 504 of a low frequency band. According to an embodiment, the relay module 191 may generate the fourth signal 504 by simultaneously performing amplification and frequency conversion of the third signal 503.

Referring to operation 613, the relay module 191 may radiate the fourth signal 504 to the communication module 190. According to various embodiments, the relay module 191 may radiate the fourth signal 504 to the communication module 190 using the second antenna (e.g., the first antenna 410 of FIG. 4). According to an embodiment, the first antenna 410 may radiate the fourth signal 504 received from the relay module 191, to the communication module 190. According to an embodiment, the communication module 190 may receive the fourth signal 501 from the relay module 191 using a plurality of antennas (e.g., the third antenna 430 of FIG. 4).

Referring to operation 614, the communication module 190 may process the fourth signal. According to various embodiments, the communication module 190 may convert the received fourth signal 504 under the control of the processor 120. According to an embodiment, the fourth signal 504 may include a frequency (e.g., 2.4 GHz, 5 GHz, and/or 6 GHz) of the same band as a signal transmitted/received by the communication module 190 to/from the external electronic device 102. According to an embodiment, the fourth signal 504 received by the communication module 190 may include a frequency (e.g., 2 GHz) of a band different from that of a signal transmitted and received with the external electronic device 102. According to an embodiment, the communication module 190 may frequency-convert the received fourth signal 504. The communication module 190 may frequency-convert the fourth signal 504 having a relatively low frequency band (e.g., 2 GHz) into a relatively high frequency band (e.g., 2.4 GHz, 5 GHz, and/or 6 GHz) and may transmit the converted signal to the processor 120.

Referring to operation 621, the communication module 190 may radiate the first signal (e.g., the first signal 501 of FIG. 4) to the relay module 191. According to an embodiment, the processor 120 (e.g., the processor 120 of FIG. 1) may generate the first signal 501, and the communication module 190 may radiate the first signal 501 received from the processor 120 using the third antenna (e.g., the third antenna 430 of FIGS. 3A and 3B). According to an embodiment, the first signal 501 generated by the processor 120 may include a frequency (e.g., 2.4 GHz, 5 GHz, and/or 6 GHz) of the same band as a signal transmitted and received to and from the external electronic device 102. According to an embodiment, the relay module 191 may use the plurality of antennas (e.g., the first antenna 410 of FIG. 4) to receive a wireless signal (e.g., the first signal 501 of FIG. 4) from the communication module 190.

Referring to operation 622, the relay module 191 may relay the received first signal 501 to radiate the relayed signal to the external electronic device 102. According to an embodiment, the relay module 191 may bypass the received first signal 501 and may radiate the first signal 501 as is without processing the first signal 501. According to an embodiment, the second signal 502 generated by the relay module 191 may be a signal obtained by relaying the first signal 501. The relay module 191 may relay the received first signal 501 as is and may radiate the relayed signal to the external electronic device 102.

Referring to operation 631, the relay module 191 may receive the third signal (e.g., the third signal 503 of FIG. 4) from the external electronic device 102. According to an embodiment, the relay module 191 may receive the third signal 503 from the external electronic device 102 through the second antenna (e.g., the second antenna 420 of FIG. 4).

Referring to operation 632, the relay module 191 may relay the received third signal 503 and may radiate the relayed signal to the communication module 190. According to an embodiment, the relay module 191 may bypass the received third signal 503 and may radiate the third signal 503 as is without processing the third signal 503. According to an embodiment, the fourth signal 504 generated by the relay module 191 may be a signal obtained by relaying the third signal 503. The relay module 191 may relay the received third signal 503 as is and may radiate the relayed signal to the communication module 190.

Figure 7A:
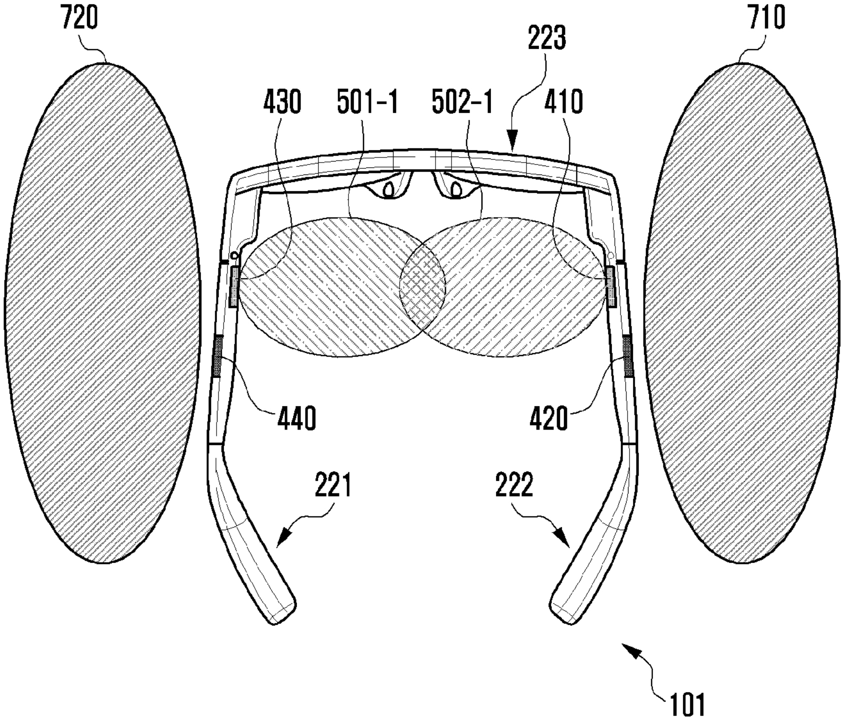
FIGS. 7A and 7B illustrate an effect according to properties of a plurality of antennas included in an electronic device according to an embodiment.
Figure 7B:
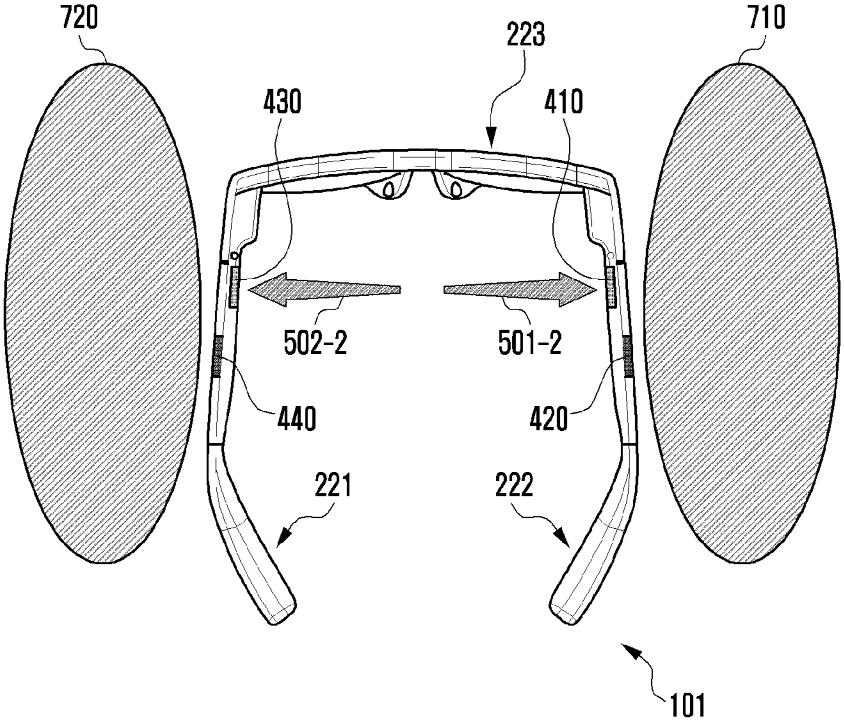

FIGS. 7A and 7B illustrate an effect according to properties of a plurality of antennas included in an electronic device according to an embodiment.

Referring to FIGS. 7A and 7B, the electronic device 101 may include the main body 223, the first support 221, and the second support 222. According to an embodiment, the first support 221 and the second support 222 may be disposed at positions spaced apart from each other and may be connected to the main body 223, respectively. According to various embodiments, the electronic device 101 may include a plurality of antennas, for example, the first antenna 410 (e.g., the first antenna 410 of FIG. 4), the second antenna 420 (e.g., the second antenna 420 of FIG. 4), the third antenna 430 (e.g., the third antenna 430 of FIG. 4), and/or the fourth antenna 440 (e.g., the fourth antenna 440 of FIG. 4). According to an embodiment, the first antenna 410 and/or the second antenna 420 may be disposed on the second support 222. According to an embodiment, the third antenna 430 and/or the fourth antenna 440 may be disposed on the first support 221.

According to various embodiments, the first antenna 410 and the third antenna 430 may transmit and receive a wireless signal and/or power to each other. According to an embodiment, the third antenna 430 may radiate a first signal (e.g., the first signal 501 of FIG. 4) to the first antenna 410 under the control of the communication module 190. According to an embodiment, the first antenna 410 may receive the first signal 501 radiated from the third antenna 430, and may transmit the received signal to a relay module (e.g., the relay module 191 of FIG. 4) disposed on the second support 222. According to an embodiment, the first antenna 410 and the third antenna 430 may be disposed at a location suitable for transmitting and receiving a signal to and from each other, respectively. According to an embodiment, the first antenna 410 may be disposed on at least a partial area of the second support 222 facing the first support 221. According to an embodiment, the third antenna 430 may be disposed on at least a partial area of the first support 221 facing the second support 222. According to an embodiment, the first antenna 410 and the third antenna 430 may be respectively disposed in a direction to face each other.

According to various embodiments, the second antenna 410 and the fourth antenna 430 may transmit/receive a wireless signal and/or power to/from the outside (e.g., the external electronic device 102 of FIG. 4). According to an embodiment, the second antenna 430 may radiate a second signal (e.g., the second signal 502 of FIG. 4) to the outside (e.g., the external electronic device 103 of FIG. 4) under the control of the communication module 190. According to an embodiment, the second antenna 420 may radiate the second signal 502 received from the relay module 191 to the outside of the electronic device 101. According to an embodiment, the fourth antenna 440 may radiate the signal received from the communication module 190 to the outside of the electronic device 101. According to an embodiment, the second antenna 420 and the fourth antenna 440 may be disposed at a location suitable for transmitting and receiving a signal to and from the outside (e.g., the external electronic device 102), respectively. According to an embodiment, the second antenna 420 may be disposed on at least a partial area of the second support 222 facing the outside of the electronic device 101. According to an embodiment, the fourth antenna 440 may be disposed on at least a partial area of the first support 221 facing the outside of the electronic device 101. According to an embodiment, the fourth antenna 440 may radiate a wireless signal to form a first radiation area 720 (e.g., the first radiation area 401 of FIGS. 3A and 3B). The first radiation area 720 may be formed, for example, over a reception distance at which the fourth signal 504 can be effectively identified. According to an embodiment, the second antenna 420 may radiate the second signal 502 to form a second radiation area 710 (e.g., the second radiation area 403 of FIGS. 3A and 3B). The second radiation area 491 may be formed, for example, over a reception distance at which the second signal 502 can be effectively identified. The second radiation area 491 may be formed to include at least a partial area of a radiation shade (e.g., the radiation shade 402 of FIGS. 3A and 3B) by the user's head (e.g., the user's head 10 of FIGS. 3A and 3B).

Referring to FIG. 7A, each of the third antenna 430 and the first antenna 410 may radiate a wireless signal to form a radiation area (e.g., the third radiation area 501-1 and/or the fourth radiation area 501-2). According to an embodiment, the third antenna 430 and/or the first antenna 410 may include a non-directorial antenna. According to an embodiment, the first antenna 410 and/or the third antenna 430 may radiate a signal of an omnidirectional pattern having no directionality. According to an embodiment, the signal radiated by the first antenna 410 and/or the third antenna 430 may include a directional signal formed only in an inward direction (e.g., a direction facing each other). According to an embodiment, the fourth signal (e.g., the fourth signal 504 of FIG. 4) radiated by the first antenna 410 may form the fourth radiation area 502-1. According to an embodiment, the first signal (e.g., the first signal 501 of FIG. 4) radiated by the third antenna 430 may form the third radiation area 501-1. According to an embodiment, the third radiation area 501-1 and the fourth radiation area 502-1 may overlap each other in at least some areas. According to an embodiment, the third radiation area 501-1 and/or the fourth radiation area 502-1 may be formed in a direction facing each other.

Referring to FIG. 7B, the third antenna 430 may include a directional antenna. For example, the third antenna 430 may have a reflector attached thereto to radiate a beam (e.g., a first directional signal 501-2) including a signal or power in a specific azimuth, so that the signal or power may be propagated in a predetermined direction. According to an embodiment, the third antenna 430 may be disposed in a location (e.g., an area facing the second support 222 or an area facing the user's head 10 of FIGS. 3A and 3B) suitable for transmitting and receiving a signal to and from other components (e.g., the first antenna 410) of the electronic device 101. According to an embodiment, the first antenna 410 may include a directional antenna. For example, the first antenna 410 may have a reflector attached thereto to radiate a beam (e.g., the fourth directional signal 502-2) including a signal or power in a specific azimuth, so that the signal or power may be propagated in a predetermined direction. According to an embodiment, the first antenna 410 may be disposed in a location (e.g., an area facing the first support 221 or an area facing the user's head 10 of FIGS. 3A and 3B) suitable for transmitting and receiving a signal to and from other components (e.g., the third antenna 430) of the electronic device 101.

An electronic device according to various embodiments disclosed herein may include a main body, a pair of glass lenses configured to be supported by the main body, at least one display module configured to be disposed on the pair of glass lenses, a first support configured to be rotatably connected to the frame, a second support configured to be rotatably connected to the frame and to be disposed to be spaced apart from the first support, a communication module configured to be disposed in the first support, a processor configured to be operatively connected to the communication module, a relay module configured to be disposed in the second support and to relay at least one signal, a first antenna configured to be disposed in the second support and to be electrically connected to the relay module, and a second antenna configured to be disposed in the second support and to be electrically connected to the relay module, wherein the processor may be configured to radiate a first signal to the relay module by controlling the communication module, and the relay module may be configured to radiate a second signal corresponding to the first signal received from the communication module using the first antenna to the outside using the second antenna.

In addition, the relay module may be configured to receive a third signal from the outside using the second antenna and to radiate a fourth signal corresponding to the fourth signal to the communication module, and the processor may be configured to receive the fourth signal by controlling the communication module.

In addition, the relay module may be configured to convert the third signal into the fourth signal.

In addition, the processor may be configured to convert the fourth signal by controlling the communication module.

In addition, the electronic device may further include a third antenna configured to be disposed in the first support and to be electrically connected to the communication module, and the processor may be configured to radiate the first signal to the first antenna using the third antenna.

In addition, the second signal may be a signal obtained by frequency-converting the first signal.

In addition, the first signal may have a different frequency band from a frequency band of the second signal.

In addition, the second signal may have at least one frequency band among 2.4 GHz, 5 GHz, or 6 GHz, and the first signal may have a frequency band avoiding at least one of the frequency bands of 2.4 GHz, 5 GHz, and 6 GHz.

In addition, the second signal may be a signal obtained by amplifying the first signal.

In addition, the second signal may be a signal obtained by relaying the first signal.

In addition, the communication module may support communication of at least one of Bluetooth and Wi-Fi.

In addition, the first antenna may be a directional antenna.

In addition, the first support and the second support may be rotated and disposed to face each other in an open state, the first antenna may be disposed on a first side surface where the second support faces the first support, and the second antenna may be disposed on a second side surface of the second support opposite the first side surface.

A method of an electronic device including a communication module and a relay module disposed to be spaced apart from the communication module according to various embodiments disclosed in the present document, the method may include: radiating a first signal to the relay module, receiving the first signal using the relay module, and radiating a second signal corresponding to the first signal to the outside using the relay module.

In addition, the method may further include receiving a third signal from the outside using the relay module, radiating a fourth signal corresponding to the third signal to the communication module using the relay module, and receiving the fourth signal by controlling the communication module.

In addition, the method may further include converting the third signal into the fourth signal.

In addition, the method may further include converting the fourth signal by controlling the communication module.

In addition, the second signal may be a signal obtained by frequency-converting the first signal.

In addition, the first signal may have a lower frequency band than a frequency band of the second signal.

In addition, the third signal may be a signal obtained by amplifying the second signal.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device, comprising:

a main body;

a pair of glass lenses configured to be supported by the main body;

at least one display module configured to be disposed on the pair of glass lenses;

a first support configured to be rotatably connected to the main body;

a second support configured to be rotatably connected to the main body and configured to be disposed to be spaced apart from the first support;

a communication module configured to be disposed in the first support;

a processor configured to be operatively connected to the communication module;

a relay module configured to be disposed in the second support and configured to relay at least one signal;

a first antenna configured to be disposed in the second support and configured to be electrically connected to the relay module; and a second antenna configured to be disposed in the second support and configured to be electrically connected to the relay module, wherein the processor is further configured to control the communication module to radiate a first signal to the relay module, and wherein the relay module is further configured to radiate a second signal corresponding to the first signal to an outside of the electronic device using the second antenna.

2. The electronic device of claim 1, wherein the relay module is further configured to receive a third signal from the outside using the second antenna and to radiate a fourth signal corresponding to the third signal to the communication module, and wherein the processor is configured to control the communication module to receive the fourth signal.

3. The electronic device of claim 2, wherein the relay module is further configured to convert the third signal into the fourth signal.

4. The electronic device of claim 2, wherein the processor is further configured to control the communication module to convert the fourth signal.

5. The electronic device of claim 1, further comprising:

a third antenna configured to be disposed in the first support and configured to be electrically connected to the communication module, wherein the processor is further configured to radiate the first signal to the first antenna using the third antenna.

6. The electronic device of claim 1, wherein the second signal comprises a signal obtained by frequency-converting the first signal.

7. The electronic device of claim 1, wherein the first signal comprises a first frequency band that is different from a second frequency band of the second signal.

8. The electronic device of claim 1, wherein the second signal comprises at least one frequency band among 2.4 GHz, 5 GHz, or 6 GHz, and wherein the first signal comprises a frequency band other than the at least one frequency band of the second signal.

9. The electronic device of claim 1, wherein the second signal comprises a signal obtained by amplifying the first signal.

10. The electronic device of claim 1, wherein the second signal comprises a signal obtained by relaying the first signal.

11. The electronic device of claim 1, wherein the communication module is configured to support communication of at least one of Bluetooth and Wi-Fi.

12. The electronic device of claim 1, wherein the first antenna comprises a directional antenna.

13. The electronic device of claim 1, wherein the first support and the second support are configured to be rotated and disposed to face each other in an open state, wherein the first antenna is configured to be disposed on a first side surface where the second support faces the first support, and wherein the second antenna is configured to be disposed on a second side surface of the second support opposite the first side surface.

* * * * *